US009135760B2

(12) United States Patent
Yuasa et al.

(10) Patent No.: US 9,135,760 B2

(45) Date of Patent: Sep. 15, 2015

(54) INFORMATION SHARING SYSTEM, ON-VEHICLE DIAGNOSIS TERMINAL, AND DISPLAY TERMINAL

(71) Applicant: NGK SPARK PLUG CO., LTD., Nagoya-shi, Aichi (JP)

(72) Inventors: Go Yuasa, RanchoPalos Verdes, CA (US); Michael J. Ramirez, West Hollywood, CA (US); Masashi Tsuzuki, Nagoya (JP)

(73) Assignee: NGK SPARK PLUG CO., LTD., Aichi (JP)

(*) Notice: Subject to any disclaimer, the term of this patent is extended or adjusted under 35 U.S.C. 154(b) by 0 days.

(21) Appl. No.: 14/534,933

(22) Filed: Nov. 6, 2014

(65) Prior Publication Data

US 2015/0134186 A1 May 14, 2015

Related U.S. Application Data

(60) Provisional application No. 61/982,004, filed on Apr. 21, 2014, provisional application No. 61/903,592, filed on Nov. 13, 2013.

(51) Int. Cl.

| | |
|---|---|
| ***G01M 17/00*** | (2006.01) |
| ***G06F 7/00*** | (2006.01) |
| ***G06F 11/30*** | (2006.01) |
| ***G06F 19/00*** | (2011.01) |
| ***G07C 5/00*** | (2006.01) |
| ***G07C 5/08*** | (2006.01) |

(52) U.S. Cl.

CPC .................................. *G07C 5/0808* (2013.01)

(58) Field of Classification Search

CPC ................................................ G07C 5/0808

USPC ................................................... 701/29.1

See application file for complete search history.

(56) References Cited

U.S. PATENT DOCUMENTS

| | | | |
|---|---|---|---|
| 2003/0236601 | A1 | 12/2003 | McLeod et al. |
| 2006/0052918 | A1 | 3/2006 | McLeod et al. |

FOREIGN PATENT DOCUMENTS

| | | |
|---|---|---|
| JP | 2005521170 A | 7/2005 |

*Primary Examiner* — Maceeh Anwari

(74) *Attorney, Agent, or Firm* — Sughrue Mion, PLLC

(57) ABSTRACT

An information sharing system (1) including a plurality of on-vehicle diagnosis terminals (10) and one or a plurality of display terminals (20) and sharing diagnostic information over wireless communication. The terminals (10, 20) include a first determination unit S7, S8 and a second determination unit S34, S35 configured to determine whether or not predetermined times T1, T2 have passed from stored clock times C1, C2 at which data sets DS are acquired from the any of the other terminals (10, 20). When the predetermined times have passed, new data sets DS are acquired and the storing into an other-vehicle data storing unit 15B and a data storing unit 25A is performed. When the predetermined times have not passed, new wireless communication is established with communication units (13, 23) of the terminals (10, 20) capable of establishing wireless communication.

10 Claims, 14 Drawing Sheets

INFORMATION SHARING SYSTEM, ON-VEHICLE DIAGNOSIS TERMINAL, AND DISPLAY TERMINAL

BACKGROUND OF THE INVENTION

1. Field of the Invention

The present invention relates to an information sharing system that includes a plurality of on-vehicle diagnosis terminals for acquiring diagnostic information on electric vehicles, and one or a plurality of display terminals for displaying the diagnostic information on the electric vehicles equipped with the on-vehicle diagnosis terminals, and which shares the diagnostic information among the terminals. The present invention also relates to an on-vehicle diagnosis terminal and a display terminal that are used in the information sharing system.

2. Description of the Related Art

Electric vehicles, such as golf carts used on golf courses and electric carts used in hospital facilities and retirement communities, include not only an electric motor as a driving source for running, but also a battery for supplying electric power to the electric motor. Thus, it is desirable to collect and control diagnostic information such as the charge state of the electric batteries so as to keep them running on golf courses or in other facilities. Patent Document 1 discloses a remote diagnostic system that allows for monitoring of diagnostic data on vehicles as described above.

[Patent Document 1] JP-T-2005-521170

Problems to be Solved by the Invention

In the remote diagnostic system of Patent Document 1, while remote devices are mounted on vehicles, a base station is provided separately, and diagnostic information of the vehicles is collected so as to be centrally controlled at the base station.

In the case of employing a system of centrally collecting information at the base station or at another centralized control system as described above, the information cannot be acquired if wireless communication cannot be performed directly between the remote devices mounted on the vehicles and the base station or the other centralized control system.

In addition, information sharing systems in which terminals communicate among themselves to share diagnostic information of electric vehicles may be devised.

However, in such systems, because terminals that have already acquired diagnostic information from each other are less likely to acquire new information by communicating again without having a sufficiently long time pass, acquisition of new diagnostic information by communicating with other terminals is delayed.

SUMMARY OF THE INVENTION

The present invention has been made in view of the above problems, and an object thereof is to provide an information sharing system by which diagnostic information can be shared among terminals, the system being capable of reducing needless communication among the terminals and driving acquisition of new diagnostic information, and an on-vehicle diagnosis terminal and a display terminal used in the information sharing system.

The above object has been achieved by providing, in a first aspect of the invention (1) an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, the on-vehicle diagnosis terminals comprising: the first communication unit, and a diagnostic information acquiring unit configured to acquire diagnostic information on an electric vehicle equipped with the on-vehicle diagnosis terminal, the one or the plurality of display terminals comprising: the second communication unit, and a display configured to display the diagnostic information on the electric vehicles equipped with the on-vehicle diagnosis terminals, and the on-vehicle diagnosis terminals and the one or the plurality of display terminals sharing the diagnostic information on the electric vehicles equipped with the on-vehicle diagnosis terminals over wireless communication among the terminals using the communication units, wherein the on-vehicle diagnosis terminals comprise: a first clock unit that keeps a common time that is unified in the information sharing system; an own-vehicle data storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; and an other-vehicle data storing unit configured to store other-vehicle data sets that comprise the data sets on other electric vehicles that are acquired through the first communication unit of the on-vehicle diagnosis terminal, wherein the one or the plurality of display terminals comprise: a second clock unit that keeps the common time; and a data storing unit configured to store data sets on the electric vehicles that are acquired through the second communication unit of the display terminal, wherein the on-vehicle diagnosis terminals comprise: a first communication establishing unit configured to establish peer-to-peer wireless communication with the communication units of the terminals capable of establishing wireless communication with the on-vehicle diagnosis terminal; a first newly-storing unit configured to make the other-vehicle data storing unit of the on-vehicle diagnosis terminal store a new data set comprising a unique identifier that is not stored in the other-vehicle data storing unit of the on-vehicle diagnosis terminal among the data sets stored in first terminals that comprise the terminals with which the wireless communication is established with the on-vehicle diagnosis terminal; a first renewing and storing unit configured to renew and store the data set that comprises the unique identifier which is the same as the unique identifier of the other-vehicle data set stored in the other-vehicle data storing unit of the on-vehicle diagnosis terminal, and has the newer acquisition clock time among the data sets stored in the first terminals; and a first clock time storing unit configured to renew and store, every time the data set stored in each first terminal is stored in the other-vehicle data storing unit of the on-vehicle diagnosis terminal, a first stored clock time in the common time for every first terminal, the first stored clock time being the stored timing, wherein the one or the plurality of display terminals comprise: a second communication establishing unit configured to establish peer-to-peer wireless communication with the communication units of the terminals capable of establishing wireless communication with the display terminal; a second newly-storing unit configured to make the data storing unit of the display terminal store a new data set comprising a unique identifier that is not stored in the data storing unit of the display terminal among the data sets stored in second terminals that comprise the terminals with which the wireless communication is established with the display terminal; a second renewing and storing unit configured to renew and store the data set that comprises the unique identifier which is the same as the unique identifier of the data set stored in the data storing unit of the display terminal, and has the newer acquisition clock time among the data sets stored in the second terminals; and a second clock time storing unit configured to renew and store, every time the data set stored in each second terminal is stored in the data storing unit of the display terminal, a second stored clock time in the common time for every second terminal, the second stored clock time being the stored timing, wherein the on-vehicle diagnosis terminals comprise a first determination unit configured to: determine, when the peer-to-peer wireless communication is established by the first communication establishing unit, whether or not a first predetermined time has passed from the first stored clock times that are stored in relation to the first terminals with which the wireless communication is established; perform, when the first predetermined time has passed, the storing into the other-vehicle data storing units using the first newly-storing units and the first renewing and storing units; and establish, when the first predetermined time has not passed, new wireless communication using the first communication establishing units with the communication units of the terminals capable of establishing wireless communication with the on-vehicle diagnosis terminal, and wherein the one or the plurality of display terminals comprise a second determination unit configured to: determine, when the peer-to-peer wireless communication is established by the second communication establishing unit, whether or not a second predetermined time has passed from the second stored clock times that are stored in relation to the second terminals with which the wireless communication is established; perform, when the second predetermined time has passed, the storing into the data storing units using the second newly-storing units and the second renewing and storing units; and establish, when the second predetermined time has not passed, new wireless communication with the communication units of the terminals capable of establishing wireless communication with the display terminal using the second communication establishing units.

The information sharing system (1) defines a system in which the on-vehicle diagnosis terminals and the display terminals share the diagnostic information on the electric vehicles over wireless communication among the terminals, which is performed using the communication units.

The on-vehicle diagnosis terminals, each terminal having an other-vehicle data storing unit, sequentially replace data sets of other-vehicles, each data set being stored in the other-vehicle data storing unit, with the new data sets, each data set being stored in any other terminal (the terminal other than the on-vehicle diagnosis terminal), over wireless communication. In addition, the display terminals also sequentially replace the data sets stored in the data storing units with the new data sets stored in any other terminal (the terminal other than the display terminal). Thus, the terminals can share the data sets containing the diagnostic information, including that of the terminals with which direct communication cannot be made, but where the data set is shared via any of the other terminals, so that each of the terminals can directly or indirectly acquire and share the data sets containing the diagnostic information that each of the on-vehicle diagnosis terminals have acquired. Thus, an information sharing system is configured in which the diagnostic information on the electric vehicles is shared among the terminals. In addition, the display terminals are capable of displaying the acquired diagnostic information on the displays.

In addition, in the information sharing system, the on-vehicle diagnosis terminals and the display terminals establish new wireless communication with any other terminals that are capable of performing communication therewith without repeatedly acquiring the data sets within the predetermined times (the first predetermined time and the second predetermined time) from the same terminals. This configuration allows the information sharing system to reduce needless communication among the terminals, and promotes the acquisition of new diagnostic information by the information sharing system.

Examples of the electric vehicles include golf carts used on golf courses, and electric carts used in hospital or amusement park facilities and retirement communities.

In addition, examples of the diagnostic information include the states of charge (SOC) of the batteries of the electric vehicles, the temperature of the respective batteries, and air pressure in the tires.

In addition, examples of the peer-to-peer wireless communication by the communication units used in the system include wireless communication in accordance with a communication protocol such as an operation mode called an ad hoc mode in an IEEE 802.11 wireless LAN protocol, and Wi-Fi Direct (trade name) formulated by the Wi-Fi Alliance.

In addition, examples of the display terminals include a tablet terminal and a PC terminal.

In a preferred embodiment (2) of the information sharing system (1) above, the first communication establishing units of the on-vehicle diagnosis terminals comprise a first searching unit configured to search for the communication units of the terminals capable of establishing wireless communication with the first communication establishing unit, the first communication establishing units of the on-vehicle diagnosis terminals are configured to establish the peer-to-peer wireless communication with the searched communication units of the terminals, the second communication establishing units of the display terminals comprise a second searching unit configured to search for the communication units of the terminals capable of establishing wireless communication with the second communication establishing unit, the second communication establishing units of the display terminals are configured to establish the peer-to-peer wireless communication with the searched communication units of the terminals, the on-vehicle diagnosis terminals are configured to, when it is determined that the first predetermined time has not passed by the first determination units, search for the terminals capable of establishing wireless communication with the on-vehicle diagnosis terminals using the first searching units, and the one or the plurality of display terminals is configured to, when it is determined that the second predetermined time has not passed by the second determination units, search for the terminals capable of establishing wireless communication with the display terminals using the second searching units.

In the information sharing system (2), when it is determined that the terminals with which the wireless communication is established are the terminals where the first predetermined time has not passed, the on-vehicle diagnosis terminals search for the terminals again using the first searching units to establish wireless communication with the searched terminals. In addition, when it is determined that the terminals with which the wireless communication is established are the terminals where the second predetermined time has not passed, the display terminals search for the terminals again using the second searching units to establish wireless communication with the searched terminals. This configuration can increase the chances of performing communication with different terminals, which can further promote sharing of the data sets.

In a preferred embodiment (3) of the information sharing system (1) above, the first communication establishing units of the on-vehicle diagnosis terminals comprise: a first list making unit configured to search for the communication units of the terminals capable of establishing wireless communication with the first communication establishing unit, and to make a first communicable terminal list; a first choosing unit configured to choose one first chosen terminal from first unestablished terminals with which wireless communication has not yet been established after making the first communicable terminal list among the first communicable terminals cited in the first communicable terminal list; and a first establishing unit configured to establish the peer-to-peer wireless communication with the communication unit of the chosen first chosen terminal, the second communication establishing units of the display terminals comprise: a second list making unit configured to search for the communication units of the terminals capable of establishing wireless communication with the second communication establishing unit, and to make a second communicable terminal list; a second choosing unit configured to choose one second chosen terminal from second unestablished terminals with which wireless communication has not yet been established after making the second communicable terminal list among the second communicable terminals cited in the second communicable terminal list; and a second establishing unit configured to establish the peer-to-peer wireless communication with the communication unit of the chosen second chosen terminal, each of the on-vehicle diagnosis terminals is configured to, when it is determined that the first predetermined time has not passed by the first determination unit, choose one new first chosen terminal from the first unestablished terminals using the first choosing unit, and each of the one or the plurality of display terminals is configured to, when it is determined that the second predetermined time has not passed by the second determination unit, choose one new second chosen terminal from the second unestablished terminals using the second choosing unit.

In the information sharing system (3), when it is determined that the terminals with which the wireless communication is established are the terminals where the first predetermined time has not passed, each of the on-vehicle diagnosis terminals chooses one new first chosen terminal among the first unestablished terminals in the already-made first communicable terminal list with which to establish new wireless communication. In addition, when it is determined that the terminals with which the wireless communication is established are the terminals where the second predetermined time has not passed, each of the one or the plurality of display terminals chooses one new second chosen terminal among the second unestablished terminals in the already-made second communicable terminal list with which to establish new wireless communication. Thus, because wireless communication is never repeatedly established with the same terminals (namely, the terminals at the other ends of new wireless communication), needless communication can be reduced. Further, communication with different terminals can be performed at an early stage, so that the information in the data sets can be disseminated at an early stage to prompt sharing of the information.

In a preferred embodiment (4) of the information sharing system (3) above, each of the on-vehicle diagnosis terminals is configured to, when it is determined that the first predetermined time has passed by the first determination unit, choose one new first chosen terminal from the first unestablished terminals using the first choosing unit after the storing into the other-vehicle data storing unit is performed, and each of the one or the plurality of display terminals is configured to, when it is determined that the second predetermined time has passed by the second determination unit, choose one new second chosen terminal from the second unestablished terminals using the second choosing unit after the storing into the data storing unit is performed.

In the information sharing system (4), when it is determined that the terminals with which the wireless communication is established are the terminals where the first predetermined time has passed, each of the on-vehicle diagnosis terminals also chooses (as in the case of the information system (3) where the first predetermined time has not passed) one new first chosen terminal among the first unestablished terminals in the already-made first communicable terminal list with which to establish new wireless communication after performing the storing into the other-vehicle data storing unit. In addition, when it is determined that the terminals with which the wireless communication is established are the terminals where the second predetermined time has passed, each of the one or the plurality of display terminals also chooses (as in the case of the information system (3) where the second predetermined time has not passed) one new second chosen terminal among the second unestablished terminals in the already-made second communicable terminal list with which to establish new wireless communication after performing the storing into the data storing unit. Thus, even after performing the storing into the other-vehicle data storing units and the data storing units, wireless communication is never repeatedly established with the same terminals (namely, the terminals at the other ends of new wireless communication). This configuration can further reduce needless communication.

In a preferred embodiment (5) of the information sharing system of any of (1) to (4) above, the one or the plurality of display terminals comprise a plurality of display terminals, and each of the second communication establishing units of the display terminals establishes wireless communication with any one of the first communication units of the on-vehicle diagnosis terminals and the second communication units of the display terminals.

In the information sharing system (5), a plurality of display terminals are included, and the second searching units of the display terminals are capable of establishing wireless communication not only with the first communication units of the on-vehicle diagnosis terminals but also with the second communication units of any other display terminals as communication units of the terminals capable of performing wireless communication with the second searching units. This configuration allows the display terminals to acquire the data sets stored in any other display terminals, so that the information in the data sets can be easily disseminated from the terminals including the display terminals to any other terminals, and thereby promote information sharing.

In a preferred embodiment (6) of the information sharing system of any of (1) to (5) above, the diagnostic information acquiring units of the on-vehicle diagnosis terminals comprise an SOC information-acquiring unit configured to acquire information on a state of charge of a battery mounted on the electric vehicle equipped with the diagnostic information acquiring unit.

In the information sharing system (6), the diagnostic information-acquiring units of the on-vehicle diagnosis terminals each include the SOC information-acquiring units configured to acquire the states of charge (SOC) of the batteries mounted on the electric vehicles. That is, the diagnostic information-acquiring units diagnose the states of charge (SOC) of the batteries mounted on the electric vehicles as the diagnostic information. This configuration allows a controller of the electric vehicles to properly control the states of charge (SOC) of the electric vehicles by charging the batteries before the electric vehicles become incapable of running, or by changing the electric vehicles.

In a preferred embodiment (7) of the information sharing system of any of (1) to (6) above, each of the first clock units and the second clock units may keep a local time that is the only time used in the information sharing system as the common time.

In the information sharing system (7), because the first clock units and the second clock units keep the local time that is the only time used in the information sharing system as the common time that is unified in the information sharing system, the system need not depend on a clock of a satellite such as a GPS satellite or on a clock time acquired by Internet connection in setting the common time. In addition, this configuration allows the system to be usable indoors or outdoors.

In a preferred embodiment (8) of the information sharing system of (7) above, each of the first clock units and the second clock units comprise a counter configured to count up at predetermined time intervals that are unified in the information sharing system, and each of the first clock units and the second clock units uses, as the local time, count values of counters acquired by starting count from predetermined timings that are unified in the information sharing system.

In the on-vehicle diagnosis units and the display terminals in the information sharing system (8), the counter values of the counters are used as the local time, so that the configurations of the first clock units and the second clock units that keep the local time can be simplified.

In a second aspect (9), the present invention, provides an on-vehicle diagnosis terminal used in an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, the on-vehicle diagnosis terminals comprising: the first communication unit; and a diagnostic information acquiring unit configured to acquire diagnostic information on an electric vehicle equipped with the on-vehicle diagnosis terminal, the one or the plurality of display terminals comprising: the second communication unit; and a display configured to display the diagnostic information on the electric vehicles equipped with the on-vehicle diagnosis terminals, and the on-vehicle diagnosis terminals and the one or the plurality of display terminals sharing the diagnostic information on the electric vehicles equipped with the on-vehicle diagnosis terminals over wireless communication among the terminals using the communication units, wherein the on-vehicle diagnosis terminal used in the information sharing system comprises: a first clock unit that keeps common time that is unified in the information sharing system; an own-vehicle data storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; an other-vehicle data storing unit configured to store other-vehicle data sets that comprise the data sets on other electric vehicles that are acquired through the first communication unit of the on-vehicle diagnosis terminal; a first communication establishing unit configured to establish peer-to-peer wireless communication with the communication units of the terminals capable of establishing wireless communication with the on-vehicle diagnosis terminal; a first newly-storing unit configured to make the other-vehicle data storing unit of the on-vehicle diagnosis terminal store a new data set comprising a unique identifier that is not stored in the other-vehicle data storing unit of the on-vehicle diagnosis terminal among the data sets stored in first terminals that comprise the terminals with which the wireless communication is established with the on-vehicle diagnosis terminal; a first renewing and storing unit configured to renew and store the data set that comprises the unique identifier which is the same as the unique identifier of the other-vehicle data set stored in the other-vehicle data storing unit of the on-vehicle diagnosis terminal, and has the newer acquisition clock time among the data sets stored in the first terminals; a first clock time storing unit configured to renew and store, every time the data set stored in each first terminal is stored in the other-vehicle data storing unit of the on-vehicle diagnosis terminal, a first stored clock time in the common time for every first terminal, the first stored clock time being the stored timing; and a first determination unit configured to determine, when the peer-to-peer wireless communication is established by the first communication establishing unit, whether or not a first predetermined time has passed from the first stored clock times that are stored in relation to the first terminals with which the wireless communication is established, wherein the on-vehicle diagnosis terminal used in the information sharing system performs, when the first predetermined time has passed, the storing into the other-vehicle data storing unit using the first newly-storing unit and the first renewing and storing unit, and wherein the on-vehicle diagnosis terminal used in the information sharing system establishes, when the first predetermined time has not passed, new wireless communication using the first communication establishing unit with the communication units of the terminals capable of establishing wireless communication with the on-vehicle diagnosis terminal.

The on-vehicle diagnosis terminals (9), each terminal having an other-vehicle data storing unit, sequentially replace data sets of other-vehicles, each data set being stored in the other-vehicle data storing unit, with the new data sets, each data set being stored in any other terminal (the terminal other than the on-vehicle diagnosis terminal) over wireless communication. Thus, the terminals can share the data sets containing the diagnostic information, including that of the terminals with which direct wireless communication cannot be made but the data set being shared via any other terminals, so that the on-vehicle diagnosis terminal can directly or indirectly acquire and share the data sets containing the diagnostic information that each of the on-vehicle diagnosis terminals have acquired.

In addition, the on-vehicle diagnosis terminal establishes new wireless communication with any other terminals that are capable of performing communication therewith without repeatedly acquiring the data sets within the first predetermined time from the same terminals. This configuration allows the information sharing system to reduce needless communication between this on-vehicle diagnosis terminal and any other terminals, and promotes acquisition of new diagnostic information by the information sharing system.

In a third aspect (10), the present invention provides a display terminal used in an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, wherein the on-vehicle diagnosis terminals comprise: the first communication unit, and a diagnostic information acquiring unit configured to acquire diagnostic information on an electric vehicle equipped with the on-vehicle diagnosis terminal; a first clock unit that keeps common time that is unified in the information sharing system; an own-vehicle data storing unit configured to store an own-vehicle data set that comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; and an other-vehicle data storing unit configured to store other-vehicle data sets that comprise the data sets on other electric vehicles that are acquired through the first communication unit of the on-vehicle diagnosis terminal, wherein the one or the plurality of display terminals comprise the second communication unit, and a display configured to display the diagnostic information on the electric vehicles equipped with the on-vehicle diagnosis terminals, wherein the on-vehicle diagnosis terminals and the one or the plurality of display terminals sharing the diagnostic information on the electric vehicles equipped with the on-vehicle diagnosis terminals over wireless communication among the terminals using the communication units, wherein the display terminal used in the information sharing system comprises: a second clock unit that keeps the common time; a data storing unit configured to store data sets on the electric vehicles that are acquired through the second communication unit of the display terminal; a second communication establishing unit configured to establish peer-to-peer wireless communication with the communication units of the terminals capable of establishing wireless communication with the display terminal; a second newly-storing unit configured to make the data storing unit of the display terminal store a new data set comprising a unique identifier that is not stored in the data storing unit of the display terminal among the data sets stored in second terminals that comprise the terminals with which the wireless communication is established with the display terminal; a second renewing and storing unit configured to renew and store the data set that comprises the unique identifier which is the same as the unique identifier of the data set stored in the data storing unit of the display terminal, and has the newer acquisition clock time among the data sets stored in the second terminals; a second clock time storing unit configured to renew and store, every time the data set stored in each second terminal is stored in the data storing unit of the display terminal, a second stored clock time in the common time for every second terminal, the second stored clock time being the stored timing; and a second determination unit configured to determine, when the peer-to-peer wireless communication is established by the second communication establishing unit, whether or not a second predetermined time has passed from the second stored clock times that are stored in relation to the second terminals with which the wireless communication is established, wherein the display terminal used in the information sharing system performs, when the second predetermined time has passed, the storing into the data storing unit using the second newly-storing unit and the second renewing and storing unit, and wherein the display terminal used in the information sharing system establishes, when the second predetermined time has not passed, new wireless communication using the second communication establishing units with the communication units of the terminals capable of establishing wireless communication with the display terminal.

The display terminal (10) sequentially renews to replace the data sets stored in the data storing unit of the display terminal with the new data sets stored in any other terminals (the terminals other than the display terminal) over wireless communication. Thus, the display terminals can share data sets containing diagnostic information, including that of the display terminals with which direct wireless communication cannot be established but the data set being shared via any other terminals. Consequently, the display terminals can directly or indirectly acquire and share the data sets containing the diagnostic information that the on-vehicle diagnosis terminals have acquired.

In addition, the display terminal establishes new wireless communication with any other terminals that are capable of performing communication therewith without repeatedly acquiring data sets within the second predetermined time from the same terminals. This configuration allows the information sharing system to reduce needless communication between this display terminal and any other terminals, and promotes acquisition of new diagnostic information by the information sharing system.

DESCRIPTION OF REFERENCE NUMERALS AND SIGNS

Figure 1:
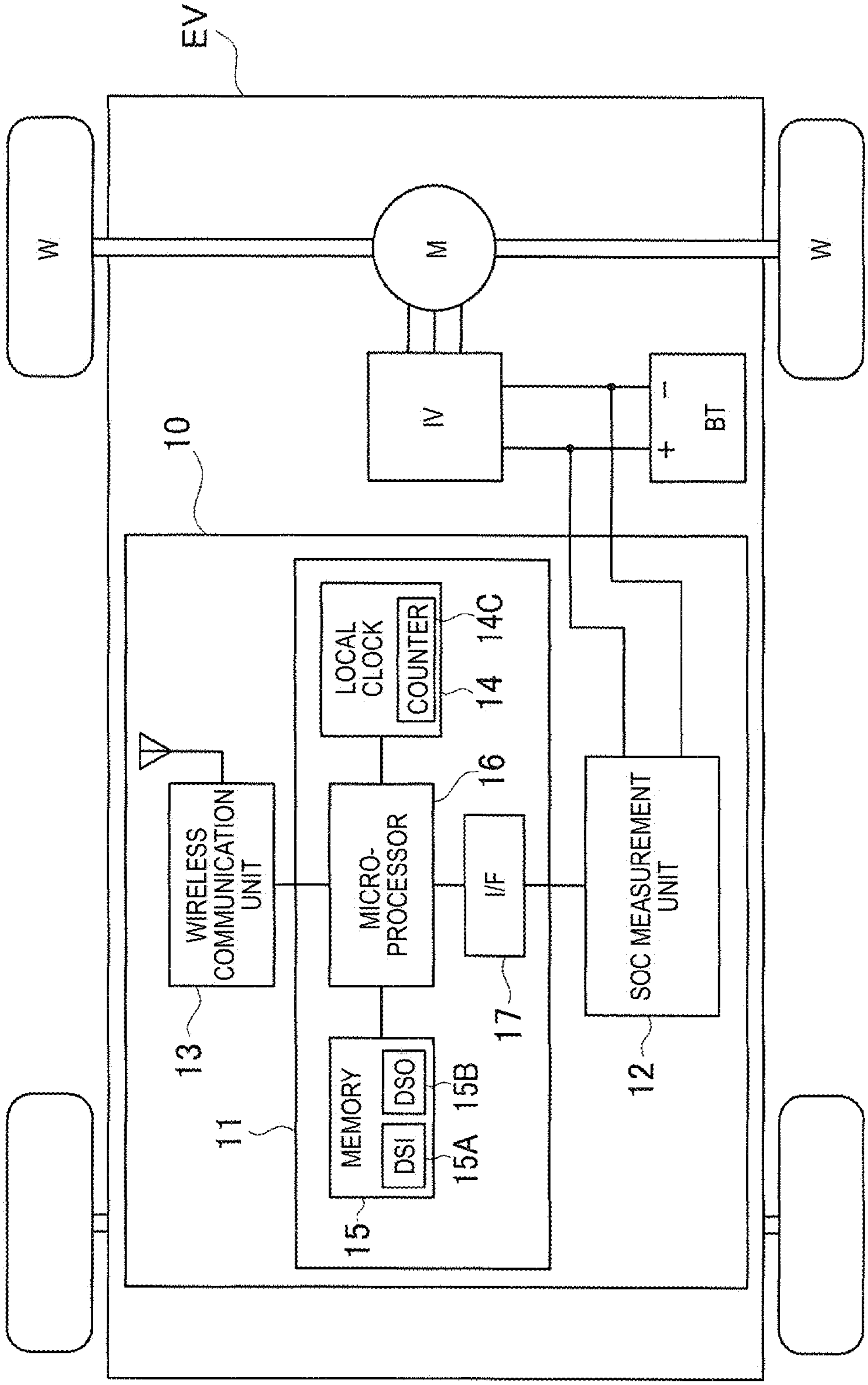
FIG. 1 is an explanatory view of a block diagram of an on-vehicle diagnosis unit according to an embodiment of the present invention, and an electric vehicle equipped with the on-vehicle diagnosis unit.

Reference numerals used to identify various features in the drawings include the following.

1 Information sharing system

EV, EVA, EVB, EVC, EVD, EVE Carts (electric vehicles)

BT Battery

10, 10A, 10B, 10C, 10D, 10E On-vehicle diagnosis units (on-vehicle diagnosis terminals, terminals)

12 SOC measurement unit (diagnostic information-acquiring unit, SOC information-acquiring unit)

13 Wireless communication unit (communication unit, first communication unit)

14 Local clock (first clock unit)

14C Counter

15 Memory

15A Own-vehicle data storing unit

15B Other-vehicle data storing unit

16 Microprocessor

20, 20A, 20B Tablet terminals (display terminals, terminals)

22 Liquid crystal display (display)

23 Wireless communication unit (communication unit, second communication unit)

24 Local clock (second clock unit)

24C Counter

25 Memory

25A Data storing unit

26 Microprocessor

DS Data set

DSI Own-vehicle data set

DSO Other-vehicle data set

ID Unique identifier

CA Acquisition clock time

C1 First stored clock time

T1 First predetermined time

C2 Second stored clock time

T2 Second predetermined time

S6 First searching unit, first communication establishing unit

S103 First newly-storing unit

S106 First renewing and storing unit

S107 First clock time storing unit

S7, S8 First determination unit

S33 Second searching unit, second communication establishing unit

S373 Second newly-storing unit

S376 Second renewing and storing unit

S377 Second clock time storing unit

S34, S35 Second determination unit

S61, S62 First list making unit (first communication establishing unit)

S63, S64 First choosing unit (first communication establishing unit)

S65 First establishing unit (first communication establishing unit)

S331, S332 Second list making unit (second communication establishing unit)

S333, S334 Second choosing unit (second communication establishing unit)

S335 Second establishing unit (second communication establishing unit)

DETAILED DESCRIPTION OF THE PREFERRED EMBODIMENTS

Hereinafter, the present invention will be described in detail by reference to the drawings. However, the present invention should not be construed as being limited thereto.

Figure 2:
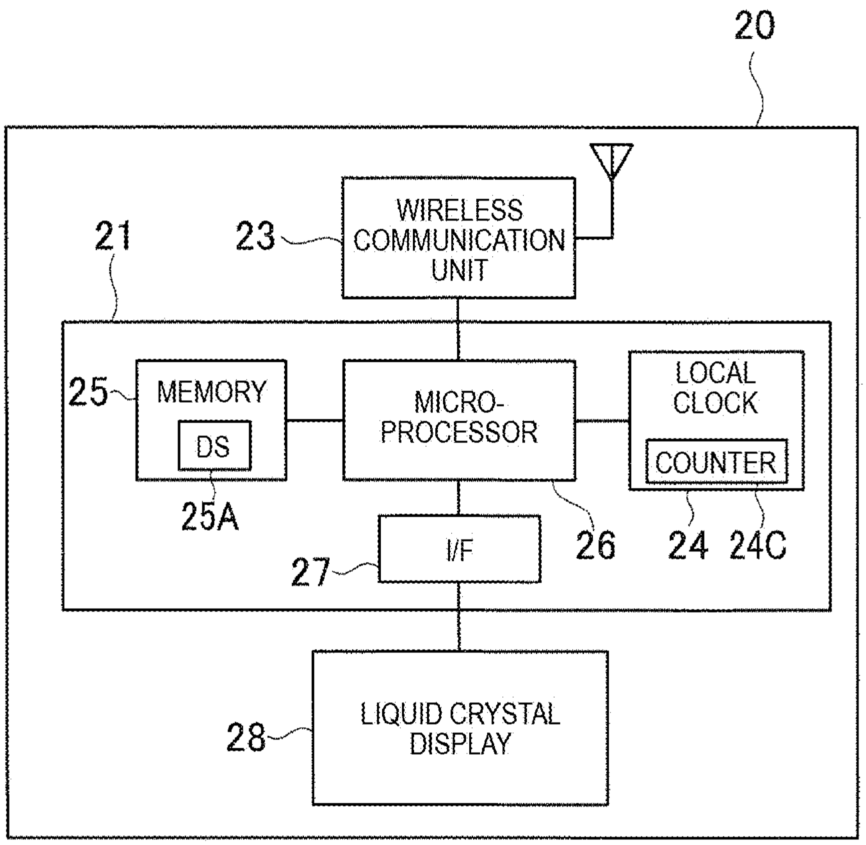
FIG. 2 is an explanatory view of a block diagram of a tablet terminal according to the embodiment of the present invention.
Figure 3:
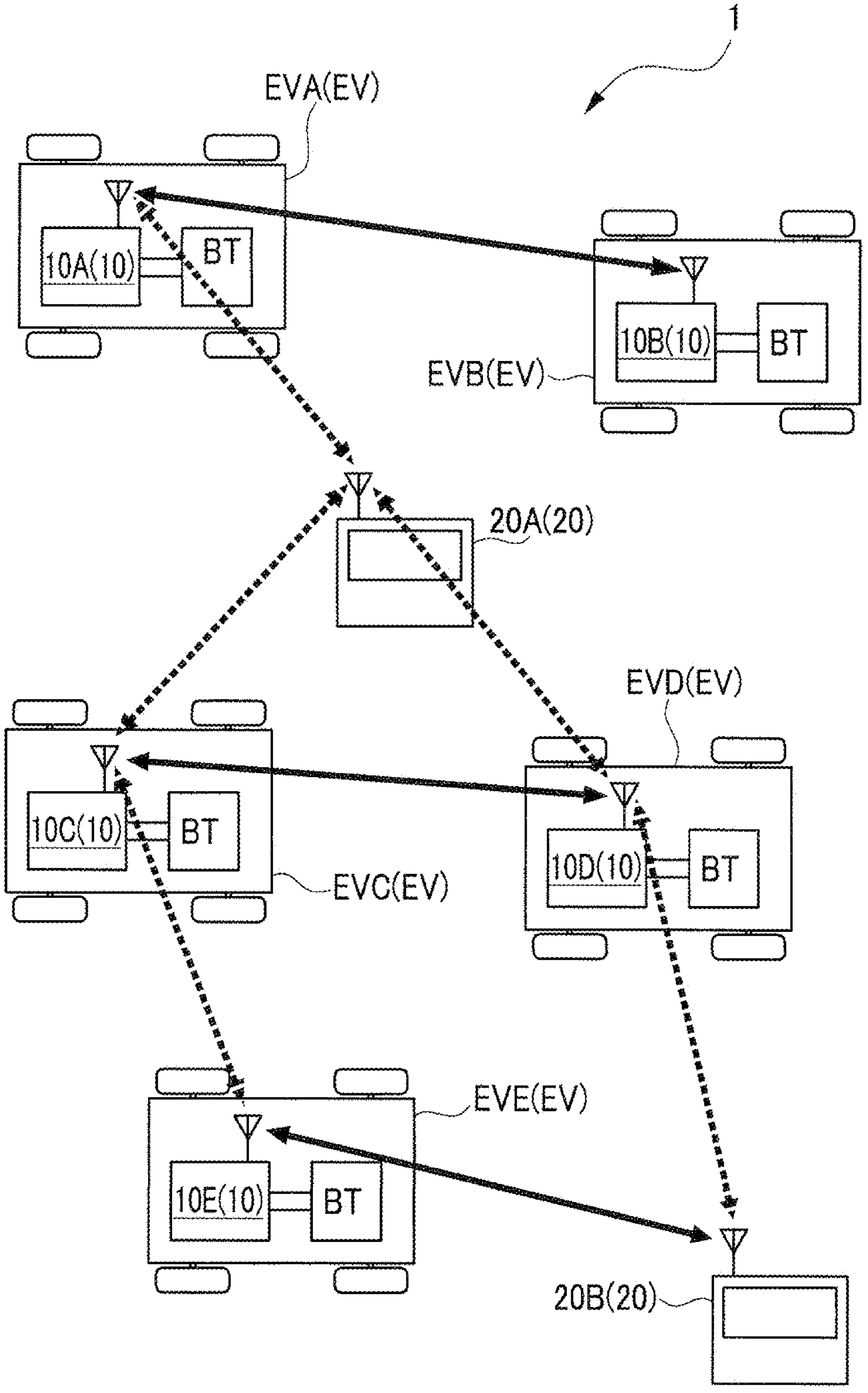
FIG. 3 is an explanatory view of a configuration of an information sharing system according to the embodiment of the present invention.

FIG. 1 is a block diagram of an on-vehicle diagnosis unit 10 that defines an on-vehicle diagnosis terminal according to the present embodiment, and a cart EV that defines an electric vehicle equipped with the on-vehicle diagnosis unit 10. FIG. 2 is a block diagram of a tablet terminal 20 that defines a display terminal according to the present embodiment. FIG. 3 is a block diagram of an information sharing system 1 according to the present embodiment that includes a plurality of the on-vehicle diagnosis units 10 (10A, 10B, 10C, 10D, 10E) mounted respectively on a plurality of the carts EV (EVA, EVB, EVC, EVD, EVE), and a plurality of tablet terminals 20 (20A, 20B). The on-vehicle diagnosis units 10 and the tablet terminals 20 are collectively referred to as the terminals 10, 20.

The carts EV (EVA, . . . ) shown in FIG. 1 and FIG. 3 define electric vehicles used on golf courses, and include an electric motor M for driving drive wheels W, an inverter IV for inverting DC voltage to AC voltage, and a battery BT for supplying electric power to the electric motor M through the inverter IV.

In addition, the on-vehicle diagnosis units 10 each mounted on the carts EV (EVA, . . . ) include a main circuit unit 11, an SOC measurement unit 12, and a wireless communication unit 13. Among these units, the main circuit units 11 include a microprocessor 16, a local clock 14 connected to a bus of the microprocessor 16, a memory 15, and an interface circuit 17 arranged to be connected to the SOC measurement unit 12. The wireless communication units 13 are also connected to the buses of the microprocessors 16.

The SOC measurement units 12 are connected to the batteries BT of the carts EV. The SOC measurement units 12 measure the states of charge (SOC) of the batteries BT, to be specific, open circuit voltages of the batteries BT corresponding to the SOC as diagnostic information on the carts EV equipped with the on-vehicle diagnosis units 10 at a constant interval (to be specific, every three minutes) at the instructions of the microprocessors 16.

In addition, the wireless communication units 13 define wireless communication modules for performing peer-to-peer wireless communication with any terminals 10, 20, being other than the on-vehicle diagnosis unit 10 (the other on-vehicle diagnosis units 10 or the tablet terminals 20), in accordance with a predetermined communication protocol (to be specific, by Wi-Fi Direct (trade name) in the present embodiment).

In addition, the local clocks 14 include a counter 14C for counting up at predetermined time intervals (every one second) that are unified in the information sharing system 1. The counters 14C have a count value that is acquired by starting a count from a predetermined timing that is unified in the information sharing system 1 (in all of the on-vehicle diagnosis units 10 and the tablet terminals 20). Thus, the local clocks 14 keep the count values of the counters 14C as local times unified and used specifically for the information sharing system 1

In addition, the on-vehicle diagnosis units 10 use unique MAC addresses of the wireless communication units 13 as the unique identifiers ID that are uniquely assigned to the on-vehicle diagnosis units 10. The on-vehicle diagnosis units 10 store data sets DS (sets of the unique identifiers ID, the diagnostic information (the measurement values of the SOC), and the acquisition clock times CA) in own-vehicle data storing units 15A of the memories 15 as own-vehicle data sets DSI (see step S5 in FIG. 4 described below). The data sets DS contain measurement values of SOC that are diagnostic information measured at a constant interval with the use of the SOC measurement units 12, acquisition clock times CA in local times at the time of acquiring the measurement values (to be specific, the count values of the counters 14C of the local clocks 14 that keep the local times), and the unique identifiers ID which are MAC addresses.

In addition, the on-vehicle diagnosis units 10 obtain other-vehicle data sets DSO that define data sets DS on the carts EV equipped with any of the other on-vehicle diagnosis units 10 over wireless communication with any of the other on-vehicle diagnosis units 10 or tablet terminals 20 by the wireless communication units 13, and store the other-vehicle data sets DSO in other-vehicle data storing units 15B.

The own-vehicle data sets DSI and the other-vehicle data sets DSO are stored in the form of data files in the own-vehicle data storing units 15A and the other-vehicle data storing units 15B of the memories 15.

In addition, the tablet terminals 20 shown in FIG. 2 include a main circuit unit 21, a wireless communication unit 23, and a liquid crystal display 28. Among them, the main circuit units 21 include a microprocessor 26, a local clock 24 (including a counter 24C having a count value which keeps a local time) connected to a bus of the microprocessor 26, a memory 25, and an interface circuit 27 arranged to be connected to the liquid crystal display 28.

The tablet terminals 20 define commercially available tablet terminals in which exclusive software for establishing the information sharing system 1 is installed. The wireless communication units 23 are configured to perform peer-to-peer wireless communication with any of the other terminals 10, 20 (the on-vehicle diagnosis units 10 or the other tablet terminals 20) in accordance with a predetermined communication protocol (by Wi-Fi Direct (trade name) in the present embodiment) in a manner similar to the wireless communication units 13 of the on-vehicle diagnosis units 10.

In addition, the tablet terminals 20 store the data sets DS on the carts EV acquired from any of the other terminals 10, 20 in the form of data files in data storing units 25A of the memories 25 over wireless communication by the wireless communication units 23.

Thus, in the information sharing system 1 shown in FIG. 3, the on-vehicle diagnosis units 10 (10A, 10B, . . . ) mounted respectively on the carts EV (EVA, EVB, . . . ) and the tablet terminals 20 (20A, 20B) acquire the data sets DS containing the diagnostic information on the carts EV (EVA, . . . ) from the adjacent wireless communication units 10, 20 capable of performing peer-to-peer wireless communication through the respective wireless communication units 13 and 23 to store the data sets DS in the memories 15 and 25 (the own-vehicle data storing units 15A, the other-vehicle data storing units 15B, and the data storing units 25A). Then, the terminals 10, 20 in the entire system 1 repeat acquisition of the data sets DS described above, and thus, for example, the tablet terminal 20B can acquire and share the data sets containing the diagnostic information on the units (10A, 10B) of the carts EVA and EVB that cannot perform direct wireless communication with the tablet terminal 20B. As described above, the terminals 10, 20 in the system 1 can share the data sets of themselves and any of the other terminals 10, 20 while renewing the data sets.

Figure 4:
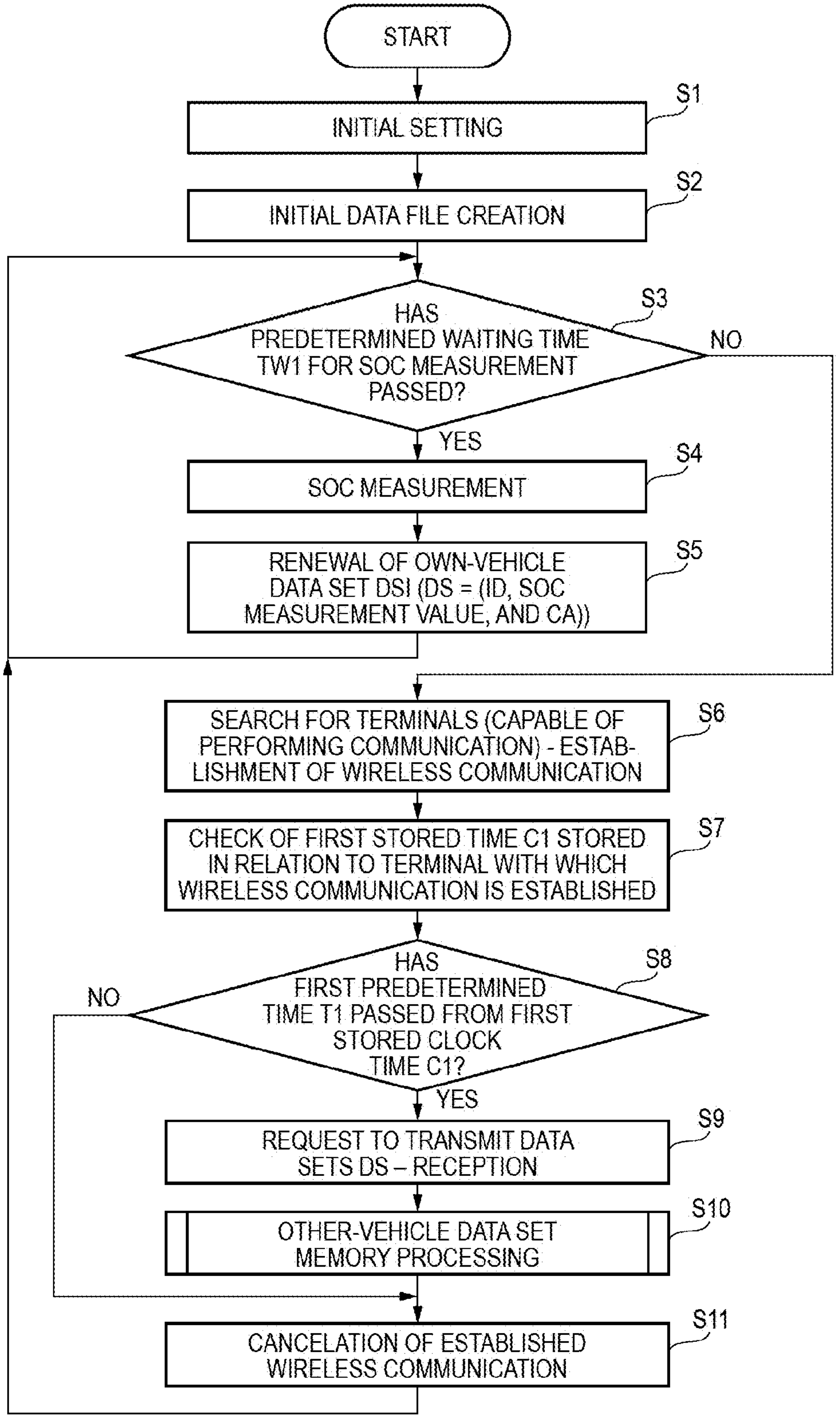
FIG. 4 is a flow chart of a processing operation of a microprocessor of the on-vehicle diagnosis unit (on-vehicle diagnosis terminal) according to the embodiment of the present invention.
Figure 5:
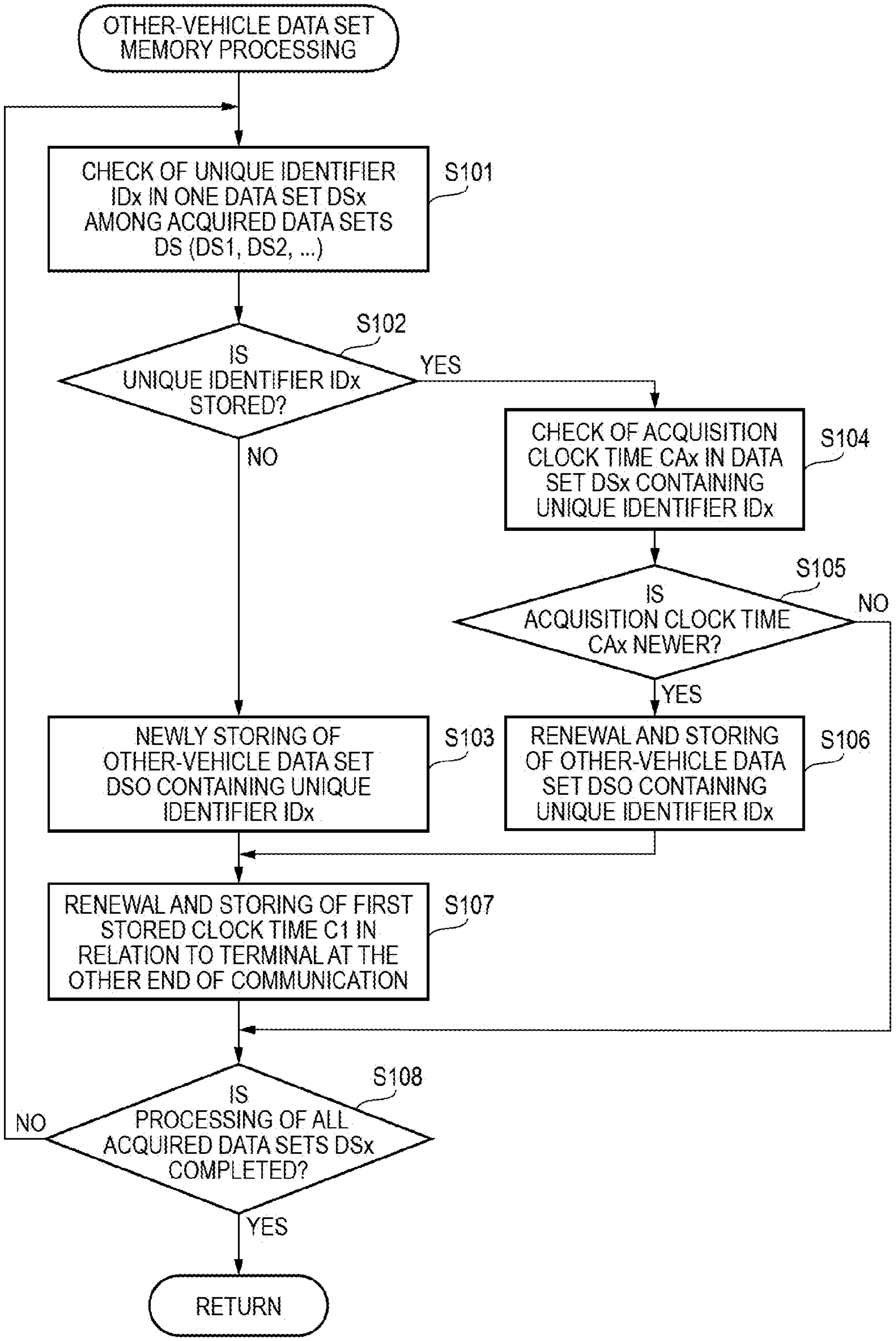
FIG. 5 is a flow chart of an other-vehicle data set memory processing routine performed by the on-vehicle diagnosis unit (on-vehicle diagnosis terminal) according to the embodiment of the present invention.
Figure 6:
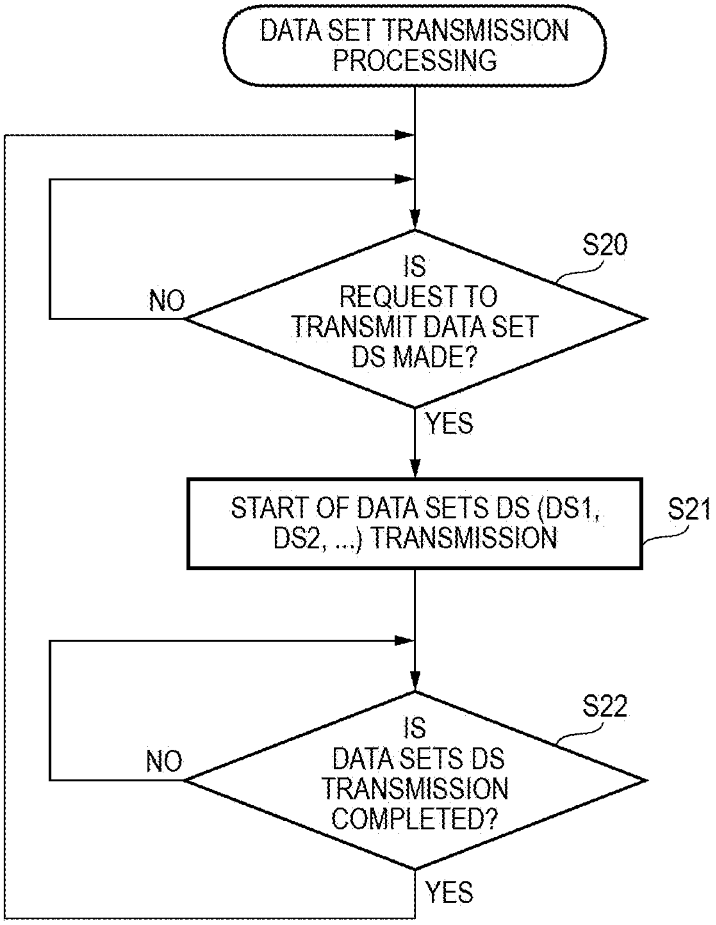
FIG. 6 is a flow chart of a data set transmission processing routine performed by a terminal at the other end of wireless communication.

Next, a detailed description of the operation of one on-vehicle diagnosis unit 10 among the terminals 10, 20 included in the information sharing system 1 will be provided referring to FIG. 4 to FIG. 6.

FIG. 4 is a flow chart of the operation relating to data set acquisition in the microprocessor 16 of the on-vehicle diagnosis unit 10.

Upon start of the operation of the microprocessor 16, first, initial settings of the wireless communication unit 13 and the SOC measurement unit 12 are made in step S1. The counter 14C of the local clock 14 that keeps the local time that is unified in the information sharing system 1 in advance counts up all the time with the use of a backup battery (not illustrated).

Then, in step S2, initial data files for storing the own-vehicle data set DSI and the other-vehicle data sets DSO are created to be stored in the memory 15 (the own-vehicle data storing unit 15A and the other-vehicle data storing unit 15B).

Then, in step S3, it is determined whether or not a predetermined waiting time TW1 for SOC measurement (three minutes in the present embodiment) has passed. When the predetermined waiting time TW1 has passed (Yes), the operation proceeds to step S4. When the predetermined waiting time TW1 has not passed (No), the operation proceeds to step S6.

In step S4, the state of charge (SOC) of the battery BT of the cart EV equipped with the on-vehicle diagnosis unit 10 is measured with the use of the SOC measurement unit 12. Specifically, an open circuit voltage (OCV) of the battery BT is measured, and a corresponding SOC is estimated from the OCV.

Next, in step S5, the on-vehicle diagnosis unit 10 stores a data set DS containing a measurement value of the acquired SOC (diagnostic information), an acquisition clock time CA in a local time at the time of acquiring the measurement value (a count value of the counter 14C of the local clock 14), and a unique identifier ID that is a MAC address of the wireless communication 13 are stored in the own-vehicle data storing unit 15A of the memory 15. Then, upon completing step S5, the operation returns to step S3. Thus, the SOC measurement of the battery BT is performed at a constant interval (=three minutes).

On the other hand, when the operation proceeds to step S6 in the case of No in step S3, the on-vehicle diagnosis unit 10 searches for the presence or absence of a wireless communication unit 13, 23 of any of the other terminals 10, 20 (another on-vehicle diagnosis unit 10 or a tablet terminal 20) that is capable of performing wireless communication with the wireless communication unit 13 of the on-vehicle diagnosis unit 10. Then, the on-vehicle diagnosis unit 10 establishes peer-to-peer wireless communication with the wireless communication unit 13, 23 of the terminal 10, 20 that has been found by the search.

Then, in step S7, the on-vehicle diagnosis unit 10 checks a first stored clock time C1 that has been stored in relation to the terminal 10, 20 with which the wireless communication is established (corresponding to the first terminal). The first stored clock time C1 defines a local time that is renewed and stored as the first stored clock time C1 for every terminal 10, 20 at the other end. Every time the data sets DS stored in the terminal 10, 20 at the other end of the wireless communication established with the wireless communication unit 13 of the on-vehicle diagnosis unit 10 (the first terminal) are stored in the other-vehicle data storing unit 15B of the on-vehicle diagnosis unit 10, the local time is renewed and stored at this stored timing (see step S107 in FIG. 5 to be described later).

Then, in the following step S8, the on-vehicle diagnosis unit 10 determines whether or not the current clock time has passed a first predetermined time T1 (T1=five minutes in the present embodiment) or more in the local time from the first stored clock time C1. When the first predetermined time T1 (T1=five minutes) or more has passed (Yes), the operation proceeds to step S9, and a request to transmit data sets DS and reception thereof are made with the terminal 10, 20 with which the wireless communication is established.

At this moment, the terminal 10, 20 at the other end of the wireless communication performs a data set transmission processing routine shown in FIG. 6, and waits for the request to transmit the data sets DS to arrive over wireless communication from the present on-vehicle diagnosis unit 10 with which the wireless communication is established in step S20. Then, upon receipt of the request to transmit the data sets DS, Yes is chosen in step S20 and the operation proceeds to step S21. Then, the terminal 10, 20 starts transmitting the data sets DS stored in the memories 15 and 25 (the own-vehicle data storing unit 15A, the other-vehicle data storing unit 15B, and the data storing unit 25A) over wireless communication toward the present on-vehicle diagnosis unit 10 with which wireless communication is established. Then, the terminal 10, 20 waits for transmission of the data sets DS to be completed in step S22 (No). When the transmission is completed (Yes), the operation returns to step S20, and the terminal 10, 20 waits for a request to transmit data sets DS again.

In this manner, the data sets DS acquired from the terminal 10, 20 at the other end of wireless communication in step S9 contain the data sets DS (e.g. DS1, DS2, . . . ) on the plurality of carts EV (e.g., EVA, EVB, . . . ) equipped with the on-vehicle diagnosis units 10 (e.g., 10A, 10B, . . . ).

Next, the operation proceeds to step S10, and an other-vehicle data set memory processing routine shown in FIG. 5 is performed. Then, upon completing the other-vehicle data set memory processing routine, the operation proceeds to step S11.

The established wireless communication is canceled in step S11, the operation then returns to step S3, and the operations of step S3 and the subsequent steps are repeated again.

On the other hand, when the first predetermined time T1 has not passed (No) in step S8, reception of data sets DS in step S9 and an other-vehicle data set memory processing routine in step S10 are not performed, and the operation proceeds to step S11. Then, after the established wireless communication is canceled in step S11, the operation returns to step S3, and the operations of step S3 and the subsequent steps are repeated again.

In this manner, the operation skips steps S8 and S9 in the case of No in step S8. The steps are skipped for the following reason.

That is, when the operation proceeds to step S6 after returning to step S3, the on-vehicle diagnosis unit 10 again searches for the presence or absence of the wireless communication unit 13, 23 of any of the other terminals 10, 20 (another on-vehicle diagnosis unit 10 or a tablet terminal 20) that is capable of performing wireless communication with the wireless communication unit 13 of the on-vehicle diagnosis unit 10. Then, the on-vehicle diagnosis unit 10 establishes new wireless communication with the newly found wireless communication unit 13, 23 of the terminal 10, 20. However, if the terminal 10, 20 with which wireless communication is established is the terminal 10, 20 at the other end from which the data sets DS have been acquired within the first predetermined time T1 (=five minutes), the possibility that new diagnostic information (SOC measurement values) is contained in the data sets DS is low because the elapsed time from the latest acquisition of the data sets DS is short. For this reason, even if wireless communication is established once in step S6 with the terminal 10, 20 from which the data sets DS have been already acquired, the established wireless communication is canceled without acquiring data sets DS until the first predetermined time T1 passes (step S11).

Thus, the data sets DS are not repeatedly acquired from the same terminals 10, 20 within the first predetermined time T1, which can reduce needless communication. In addition, the on-vehicle diagnosis unit 10 can return again to step S6 at an early stage to search for the wireless communication unit 13, 23 of the terminal 10, 20 that is capable of performing wireless communication with the on-vehicle diagnosis unit 10, and newly establish wireless communication therewith in order to acquire new diagnostic information.

Next, a description of an other-vehicle data set memory processing routine in step S10 will be provided referring to FIG. 5.

First, in step S101, a unique identifier IDx in one data set DSx is checked among the data sets DS (DS1, DS2, . . . ) that are acquired from the other terminal 10, 20 in step S9 in FIG. 4.

Then, in the following step S102, the on-vehicle diagnosis unit 10 determines whether or not the unique identifier IDx is contained in the data sets DS stored in the other-vehicle data storing unit 15B of the on-vehicle diagnosis unit 10, that is, whether or not the unique identifier IDx is stored in the other-vehicle data storing unit 15B.

When the unique identifier IDx is not stored in the other-vehicle data storing unit 15B (No), the operation proceeds to step S103, and the data set DSx containing the unique identifier IDx is stored as a new other-vehicle data set DSO in the other-vehicle data storing unit 15B. Then, the operation proceeds to step S107.

On the other hand, when the unique identifier IDx is stored in the other-vehicle data storing unit 15B (Yes), the operation proceeds to step S104, and an acquisition clock time CAx in the data set DSx containing the unique identifier IDx is checked. Further, in the following step S105, the on-vehicle diagnosis unit 10 determines whether or not the acquisition clock time CAx is newer than the acquisition clock time CA in the data set DS stored in the other-vehicle data storing unit 15B of the on-vehicle diagnosis unit 10. That is, the on-vehicle diagnosis unit 10 determines whether or not the acquired data set DSx is newer than the data set DS the on-vehicle diagnosis unit 10 stores. Specifically, the on-vehicle diagnosis unit 10 compares the sizes of the counter values of the acquisition clock time CAx and the acquisition clock time CA.

When the acquisition clock time CAx is newer (CAx>CA: Yes), the operation proceeds to step S106, and the data set DSx containing the unique identifier IDx is renewed and stored as the other-vehicle data set DSO in the other-vehicle data storing unit 15B. Then, the operation proceeds to step S107.

In step S107, a current local time, which is the timing at which the other-vehicle data set DSO is stored in the other-vehicle data storing unit 15B, is renewed and stored as the first stored clock time C1 in relation to the terminal 10, 20 at the other end of the communication (the first terminal) for every terminal 10, 20. Then, the operation proceeds to step S108.

In addition, when the acquisition clock time CAx is not newer (CAx≤CA: No) in step S105, neither renewal of the other-vehicle data set DSO in step S106 nor renewal of the first stored clock time C1 in step S107 is performed, and the operation proceeds to step S108.

In step S108, the on-vehicle diagnosis unit 10 determines whether or not processing of all the acquired data sets DSx is completed. When the processing is not completed (No), the operation returns to step S101, and the operations of step S101 to step S108 are repeated until processing of all the acquired data sets DSx is completed. Then, the processing of all the acquired data sets DSx is completed (Yes), the other-vehicle data set memory processing routine is completed, and the operation proceeds to step S11 in FIG. 4.

Then, this processing is performed in each of the on-vehicle diagnosis units 10 (10A, 10B, . . . ), and thereby the SOC measurement values (diagnostic information) in relation to the on-vehicle diagnosis units 10 (10A, 10B, . . . ) are shared in the information sharing system 1.

Figure 7:
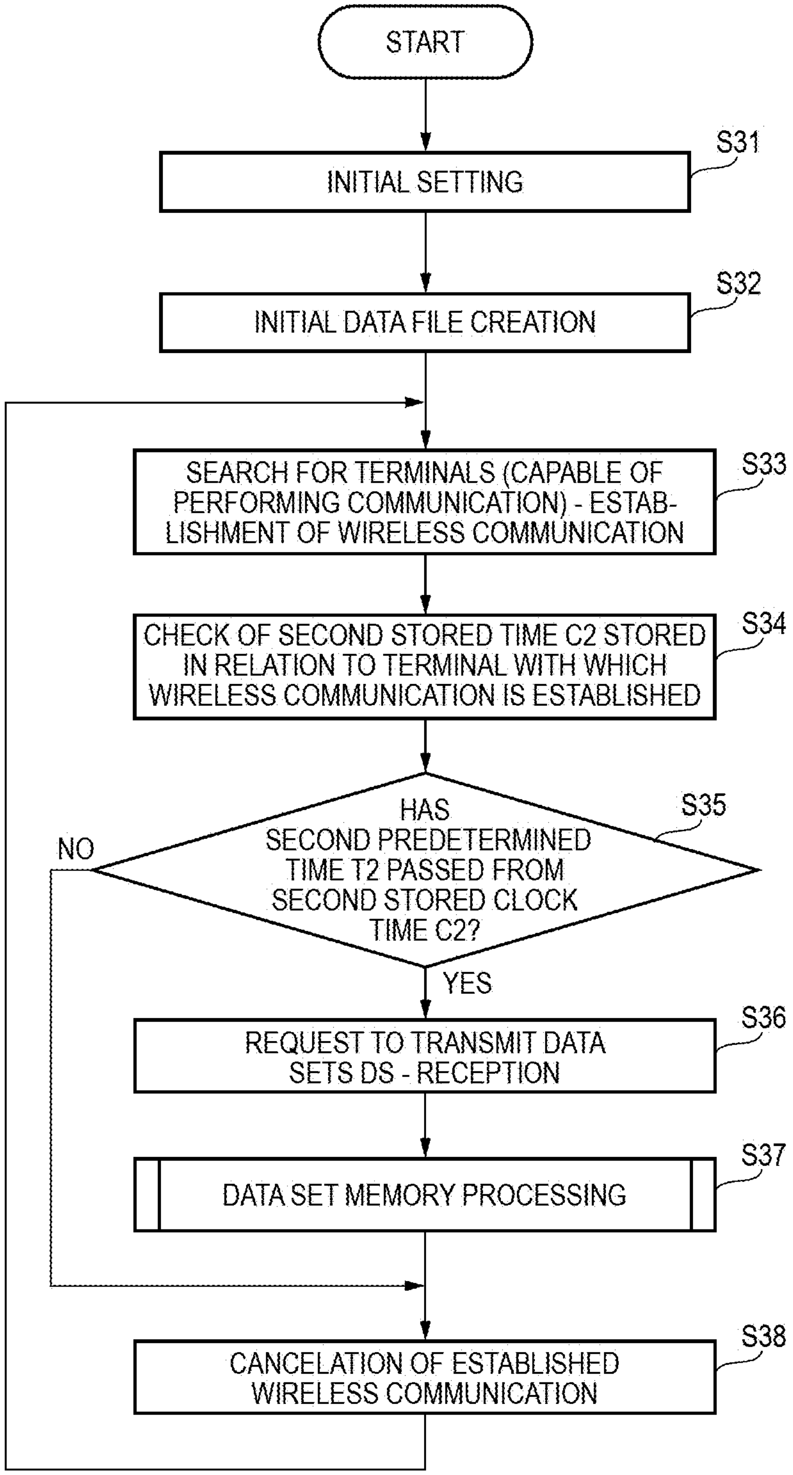
FIG. 7 is a flow chart of a processing operation of a microprocessor of the tablet terminal (display terminal) according to the embodiment of the present invention.
Figure 8:
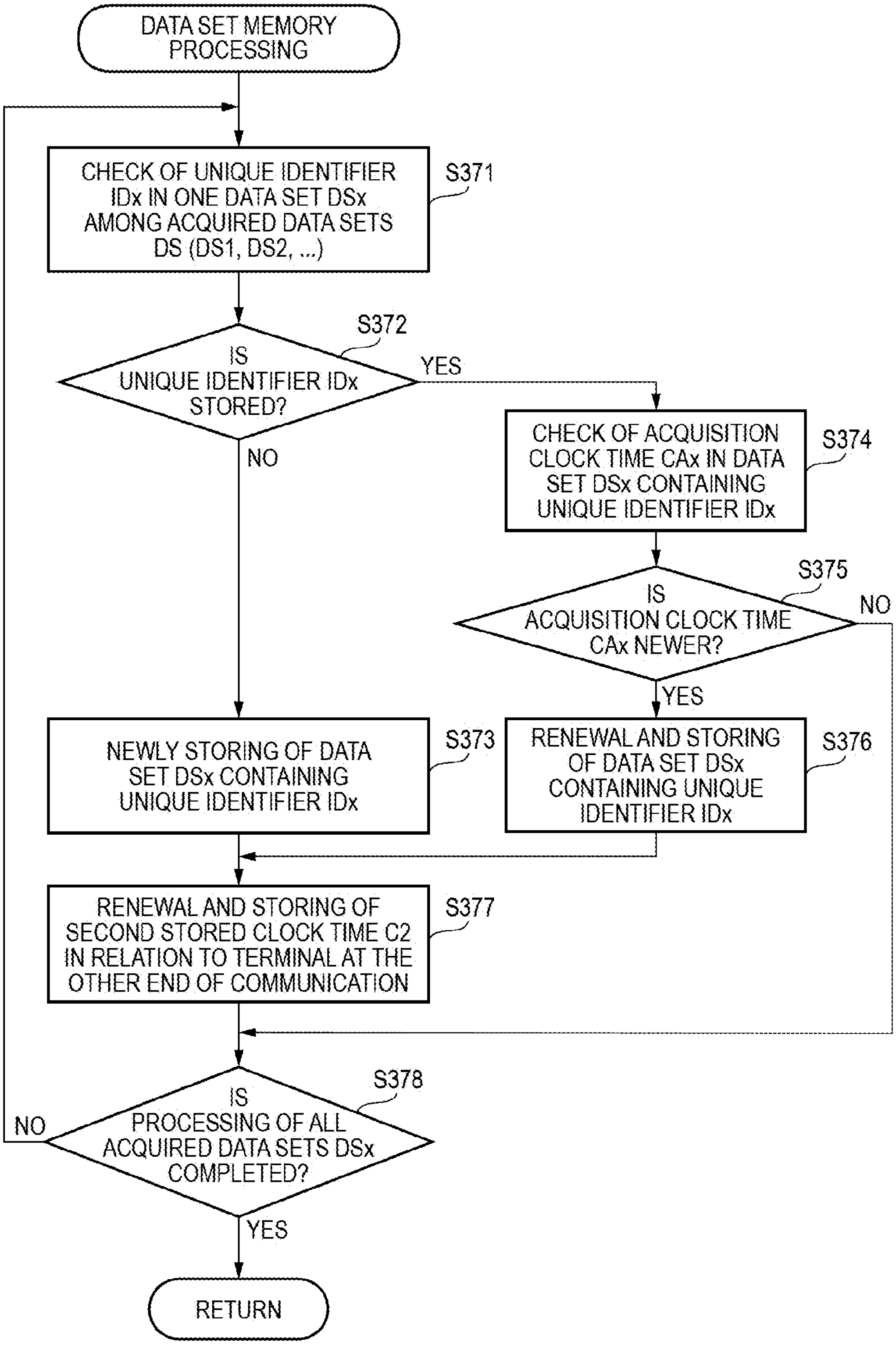
FIG. 8 is a flow chart of a data set memory processing routine performed by the tablet terminal (display terminal) according to the embodiment of the present invention.

Next, a detailed description of the operation of one tablet terminal 20 among the terminals 10, 20 included in the information sharing system 1 will be provided referring to FIG. 7 and FIG. 8.

FIG. 7 is a flow chart of operation concerning data set acquisition in the microprocessor 26 of the tablet terminal 20.

Upon start of the operation of the microprocessor 26, first, an initial setting of the wireless communication unit 23 is made in step S31. The counter 24C of the local clock 24 that keeps the local time that is unified in the information sharing system 1 in advance counts up all the time using a backup battery (not illustrated).

Then, in step S32, an initial data file for storing data sets DS is created, to be stored in the memory 25 (the data storing unit 25A).

Next, the operation proceeds to step S33, and the tablet terminal 20 searches for the presence or absence of a wireless communication unit 13, 23 of any of the other terminals 10, 20 (an on-vehicle diagnosis unit 10 or another tablet terminal 20) that is capable of performing wireless communication with the wireless communication unit 23 of the tablet terminal 20. Then, the on-vehicle diagnosis unit 10 establishes peer-to-peer wireless communication with the wireless communication unit 13, 23 of the terminal 10, 20 that has been found by the search.

Then, in step S34, the tablet terminal 20 checks a second stored clock time C2 that has been stored in relation to the terminal 10, 20 with which the wireless communication is established (corresponding to the second terminal). In a manner similar to the first stored clock time C1 of the on-vehicle diagnosis unit 10, the second stored clock time C2 defines a local time that is renewed and stored as the second stored clock time C2 for every terminal 10, 20 at the other end. Every time the data sets DS stored in the terminal 10, 20 at the other end of the wireless communication established with the wireless communication unit 23 of the tablet terminal 20 (the second terminal) are stored in the data storing unit 25A of the tablet terminal 20, the local time is renewed and stored at this stored timing (see step S377 in FIG. 8 to be described below).

Then, in the following step S35, the tablet terminal 20 determines whether or not the current clock time has passed a second predetermined time T2 (T2=five minutes in the present embodiment) or more in the local time from the second stored clock time C2. When the second predetermined time T2 (=five minutes) or more has passed (Yes), the operation proceeds to step S36, and a request to transmit data sets DS and reception thereof are made with the terminal 10, 20 with which the wireless communication is established.

At this moment, the terminal 10, 20 at the other end of wireless communication performs a data set transmission processing routine shown in FIG. 6 as described above.

Then, the data sets DS acquired from the terminal 10, 20 at the other end of wireless communication in step S36 contain the data sets DS (e.g. DS1, DS2, . . . ) on the plurality of carts EV (e.g., EVA, EVB, . . . ) equipped with the on-vehicle diagnosis units 10 (e.g., 10A, 10B, . . . ).

Next, the operation proceeds to step S37, and the tablet terminal 20 performs a data set memory processing routine shown in FIG. 8. Then, upon completion of the data set memory processing routine, the operation proceeds to step S38.

The established wireless communication is canceled in step S38, the operation returns to step S33, and the operations of step S33 and the subsequent steps are repeated again.

On the other hand, when the second predetermined time T2 has not passed (No) in step S35, reception of data sets DS in step S36 and a data set memory processing routine in step S37 are not performed, and the operation proceeds to step S38. Then, after the established wireless communication is canceled in step S38, the operation returns to step S33, and the operations of step S33 and the subsequent steps are repeated again.

In this manner, the operation skips steps S36 and S37 in the case of No in step S35. The steps are skipped for the following reason.

That is, when the operation returns to step S33, the tablet terminal 20 again searches for the presence or absence of the wireless communication unit 13, 23 of any of the other terminals 10, 20 (an on-vehicle diagnosis unit 10 or another tablet terminal 20) that is capable of performing wireless communication with the wireless communication unit 23 of the tablet terminal 20. Then, the tablet terminal 20 establishes new wireless communication with the newly found wireless communication unit 13, 23 of the terminal 10, 20. However, if the terminal 10, 20 with which wireless communication is established is the terminal 10, 20 at the other end from which the data sets DS have been acquired within the second predetermined time T2 (=five minutes), the possibility that new diagnostic information (SOC measurement values) is contained in the data sets DS is low because the elapsed time from the latest acquisition of the data sets DS is short. For this reason, even if wireless communication is once established in step S33 with the terminal 10, 20 from which the data sets DS have been already acquired, the established wireless communication is canceled without acquiring data sets DS until the second predetermined time T2 passes (step S38).

Thus, the data sets DS are not repeatedly acquired from the same terminals 10, 20 within the second predetermined time T2, which can reduce needless communication. In addition, the tablet terminal 20 can return again to step S33 at an early stage to search for the wireless communication unit 13, 23 of the terminal 10, 20 that is capable of performing wireless communication with the tablet terminal 20, and newly establish wireless communication therewith in order to acquire new diagnostic information.

Next, a description of a data set memory processing routine in step S37 will be provided referring to FIG. 8. This data set memory processing routine is approximately the same as the other-vehicle data set memory processing routine performed by the microprocessor 16 of the on-vehicle diagnosis unit 10 shown in FIG. 5.

First, in step S371, a unique identifier IDx in one data set DSx is checked among the data sets DS (DS1, DS2, . . . ) that are acquired from the other terminal 10, 20 in step S36 in FIG. 7.

Then, in the following step S372, the tablet terminal 20 determines whether or not the unique identifier IDx is contained in the data sets DS stored in the data storing unit 25A of the tablet terminal 20, that is, whether or not the unique identifier IDx is stored in the data storing unit 25A.

When the unique identifier IDx is not stored in the data storing unit 25A (No), the operation proceeds to step S373, and the data set DSx containing the unique identifier IDx is stored as new in the data storing unit 25A. Then, the operation proceeds to step S377.

On the other hand, when the unique identifier IDx is stored in the data storing unit 25A (Yes), the operation proceeds to step S374, and an acquisition clock time CAx in the data set DSx containing the unique identifier IDx is checked. Further, in the following step S375, the tablet terminal 20 determines whether or not the acquisition clock time CAx is newer than the acquisition clock time CA in the data set DS stored in the data storing unit 25A of the tablet terminal 20. That is, the on-vehicle diagnosis unit 10 determines whether or not the acquired data set DSx is newer than the data set DS the on-vehicle diagnosis unit 10 stores. To be specific, the on-vehicle diagnosis unit 10 compares the sizes of the counter values of the acquisition clock time CAx and the acquisition clock time CA.

When the acquisition clock time CAx is newer (CAx>CA: Yes), the operation proceeds to step S376, and the data set DSx containing the unique identifier IDx is renewed and stored in the data storing unit 25A. Then, the operation proceeds to step S377.

In step S377, a current local time, which is the timing at which the data set DSx is stored in the data storing unit 25A, is renewed and stored as the second stored clock time C2 in relation to the terminal 10, 20 at the other end of the communication (the second terminal) for every terminal 10, 20. Then, the operation proceeds to step S378.

In addition, in step 375, when the acquisition clock time CAx is not newer (CAx≤CA: No), neither renewal of the data set DSx in step S376 nor renewal of the second stored clock time C2 in step S377 is performed, and the operation proceeds to step S378.

In step S378, the tablet terminal 20 determines whether or not processing of all the acquired data sets DSx is completed. When the processing is not completed (No), the operation returns to step S371, and the operations of step S371 to step S378 are repeated until processing of all the acquired data sets DSx is completed. Then, the processing of all the acquired data sets DSx is completed (Yes), the data set memory processing routine is completed, and the operation proceeds to step S38 in FIG. 7.

Then, this processing is performed in each of the tablet terminals 20 (20A, 20B, . . . ), and thereby the SOC measurement values (diagnostic information) of the on-vehicle diagnosis units 10 are shared also by the tablet terminals 20. Further, the tablet terminals 20 display the acquired diagnostic information on the carts EV on the liquid crystal displays 28 of the tablet terminals 20. Thus, it is possible to check the SOC of the batteries BT of the carts EV using the tablet terminals 20, and thereby the carts EV can be controlled.

The on-vehicle diagnosis units 10 correspond to the on-vehicle diagnosis terminals in the present embodiment. In the on-vehicle diagnosis units 10, the SOC measurement units 12 correspond to the diagnostic information-acquiring units and the SOC information-acquiring units of the present invention. The wireless communication units 13 correspond to the communication units and the first communication units of the present invention. Further, the local clocks 14 including the counters 14C correspond to the first clock units of the present invention.

In addition, the tablet terminals 20 correspond to the display terminals. Among them, the liquid crystal displays 28 correspond to the displays, and the wireless communication units 23 correspond to the communication units and the second communication units. Further, the local clocks 24 including the counters 24C correspond to the second clock units.

In addition, in the on-vehicle diagnosis units 10, the microprocessors 16 that perform step S6 correspond to the first communication establishing units including the first searching unit. Further, the microprocessors 16 that perform step S103 correspond to the first newly-storing units. The microprocessors 16 that perform step S106 correspond to the first renewing and storing units. The microprocessors 16 that perform step S107 correspond to the first clock time storing units. Further, the microprocessors 16 that perform steps S7, S8 correspond to the first determination units.

In addition, in the tablet terminals 20, the microprocessors 26 that perform step S33 correspond to the second communication establishing units including the second searching unit. Further, the microprocessors 26 that perform step S373 correspond to the second newly-storing units. The microprocessors 26 that perform step S376 correspond to the second renewing and storing units. The microprocessors 26 that perform step S377 correspond to the second clock time storing units. Further, the microprocessors 26 that perform steps S34, S35 correspond to the second determination units.

As described above, the information sharing system 1 according to the present embodiment defines a system in which the on-vehicle diagnosis units 10 (10A, 10B, . . . ) and the tablet terminals 20 (20A, 20B, . . . ) share the diagnostic information (SOC measurement values) on the plurality of carts EV (EVA, EVB, . . . ) over wireless communication among the terminals 10, 20 using the wireless communication units 13, 23.

The on-vehicle diagnosis units 10 sequentially renew to replace the other-vehicle data sets DSO stored in the other-vehicle data storing units 15B of the on-vehicle diagnosis units 10 with the new data sets DS stored in any of the other terminals 10, 20 (the terminals other than the on-vehicle diagnosis units 10) over wireless communication. In addition, the tablet terminals 20 sequentially renew to replace the data sets DS stored in the data storing units 25A with the new data sets DS stored in any of the other terminals 10, 20 (the terminals other than the tablet terminals 20). Thus, the terminals 10, 20 can share the data sets DS containing the diagnostic information possessed by the terminals 10, 20 with which direct wireless communication cannot be made via any of the other terminals 10, 20, so that the terminals 10, 20 can directly or indirectly acquire and share the data sets DS containing the diagnostic information that the on-vehicle diagnosis units 10 have acquired. This configuration makes up the information sharing system 1 that shares the diagnostic information on the carts EV via communication among the terminals 10, 20.

In addition, the tablet terminals 20 can display the diagnostic information on the on-vehicle diagnosis units 10 on the liquid crystal displays 28 (the displays).

In addition, in the information sharing system 1, the on-vehicle diagnosis units 10 and the tablet terminals 20 establish new wireless communication with any of the other terminals 10, 20 that are capable of performing communication therewith without repeatedly acquiring the data sets DS within the predetermined times (the first predetermined time T1 and the second predetermined time T2) from the same terminals 10, 20.

This configuration allows the information sharing system 1 to reduce needless communication among the terminals 10, 20, and promotes acquisition of new diagnostic information by the information sharing system 1.

In addition, in the information sharing system 1 according to the present embodiment, when the terminals 10, 20 with which the on-vehicle diagnosis units 10 establish wireless communication are the terminals 10, 20 where the first predetermined time T1 has not passed, the on-vehicle diagnosis units 10 again search for any of the other terminals 10, 20 that are capable of performing communication therewith, and establish wireless communication with the found terminals 10, 20. In addition, when the terminals 10, 20 with which the tablet terminals 20 establish wireless communication are the terminals 10, 20 where the second predetermined time T2 has not passed, the tablet terminals 20 again search for any of the other terminals 10, 20 that are capable of performing communication therewith, and establish wireless communication with the found terminals 10, 20. This configuration can increase the chances of performing communication with different terminals 10, 20, which can further promote sharing of the data sets DS.

Further, the information sharing system 1 according to the present embodiment includes the plurality of tablet terminals 20, and the second communication establishing units (step S33) of the plurality of tablet terminals 20 can establish wireless communication not only with the wireless communication units 13 (the first communication units) of the on-vehicle diagnosis units 10 but also with the wireless communication units 23 (the second communication units) of any other tablet terminals 20 as the communication units of the terminals 10, 20 that are capable of performing wireless communication with the wireless communication units 23 of the tablet terminals 20.

This configuration allows the tablet terminals 20 to acquire the data sets DS stored in any of the other tablet terminals 20, so that the information in the data sets DS can be easily disseminated from the terminals 10, 20 including the tablet terminals 20 to any of the other terminals 10, 20, and thereby the sharing can be promoted.

Further, in the information sharing system 1 according to the present embodiment, the SOC measurement units 12 (the SOC information-acquiring units) of the on-vehicle diagnosis units 10 diagnose the states of charge (SOC) of the batteries BT mounted on the carts EV as diagnostic information. This configuration allows the controller of the carts EV to properly control the states of charge (SOC) of the carts EV by charging the batteries BT before the carts EV become incapable of running, or by changing the carts EV.

Further, in the information sharing system 1 according to the present embodiment, the local clocks 14 (the first clock units) and the local clocks 24 (the second clock units) keep the local times that are used only in the information sharing system 1 as the common time that is unified in the information sharing system 1. Thus, the system 1 can be made without dependence upon a clock of a satellite such as a GPS satellite or on a clock time acquired by Internet connection in setting the common time. In addition, this configuration allows the system 1 to be usable indoors or outdoors.

Further, in the on-vehicle diagnosis units 10 and the tablet terminals 20 in the information sharing system 1 according to the present embodiment, the counter values of the counters 14C, 24C are used as the local times, so that the configurations of the local clocks 14 (the first clock units) and the local clocks 24 (the second clock units) that keep the local times can be simplified.

In addition, the on-vehicle diagnosis units 10 according to the present embodiment sequentially renew to replace the other-vehicle data sets DSO stored in the other-vehicle data storing units 15B of the on-vehicle diagnosis units 10 with the new data sets DS stored in any of the other terminals 10, 20 (the terminals other than the on-vehicle diagnosis units 10) over wireless communication. Thus, the terminals 10, 20 can share the data sets DS containing the diagnostic information possessed by the terminals 10, 20 with which direct wireless communication cannot be made via any of the other terminals 10, 20, so that the terminals 10, 20 can directly or indirectly acquire and share the data sets DS containing the diagnostic information that the on-vehicle diagnosis units 10 have acquired.

In addition, the on-vehicle diagnosis units 10 establish new wireless communication with any of the other terminals 10, 20 that are capable of performing communication therewith without repeatedly acquiring the data sets DS within the first predetermined time T1 from the same terminals 10, 20. This configuration allows the information sharing system 1 to reduce needless communication between the on-vehicle diagnosis units 10 and any of the other terminals 10, 20, and promotes the acquisition of new diagnostic information by the information sharing system 1.

In addition, the tablet terminals 20 according to the present embodiment sequentially renew to replace the data sets DS stored in the data storing units 25A of the tablet terminals 20 with the new data sets DS stored in any of the other terminals 10, 20 (the terminals other than tablet terminals 20) over wireless communication. Thus, the tablet terminals 20 can share the data sets DS containing the diagnostic information possessed by the terminals 10, 20 with which direct wireless communication cannot be made via any of the other terminals 10, 20, so the tablet terminals 20 can directly or indirectly acquire and share the data sets DS containing the diagnostic information that the on-vehicle diagnosis units 10 have acquired.

In addition, the tablet terminals 20 establish new wireless communication with any of the other terminals 10, 20 that are capable of performing communication therewith without repeatedly acquiring the data sets DS within the second predetermined time T2 from the same terminals 10, 20. This configuration allows the information sharing system 1 to reduce needless communication between the tablet terminals 20 and any of the other terminals 10, 20, and promotes acquisition of new diagnostic information by the information sharing system 1.

(Modified embodiment 1)

Next, a description of a first modified embodiment of the above-described embodiment will be provided referring to the flow charts of FIG. 9 to FIG. 12. While the entire configuration and the like of the information sharing system 1 according to the present modified embodiment 1 are the same as those of the above-described embodiment shown in FIG. 1 to FIG. 3, a part of the processing operation of the microprocessors 16 of the on-vehicle diagnosis units 10 and a part of the processing operation of the microprocessors 26 of the tablet terminals 20 are different from the above-described embodiment. Thus, explanations of parts similar to the above-described embodiment are omitted or simplified. Detailed descriptions of the operation of the on-vehicle diagnosis units 10 and the operation the tablet terminals 20 included in the information sharing system 1 according to the present modified embodiment 1 will be provided while mainly explaining aspects different from the above-described embodiment.

First, a detailed description of the operation of one on-vehicle diagnosis unit 10 according to the present modified embodiment 1 will be provided.

Figure 9:
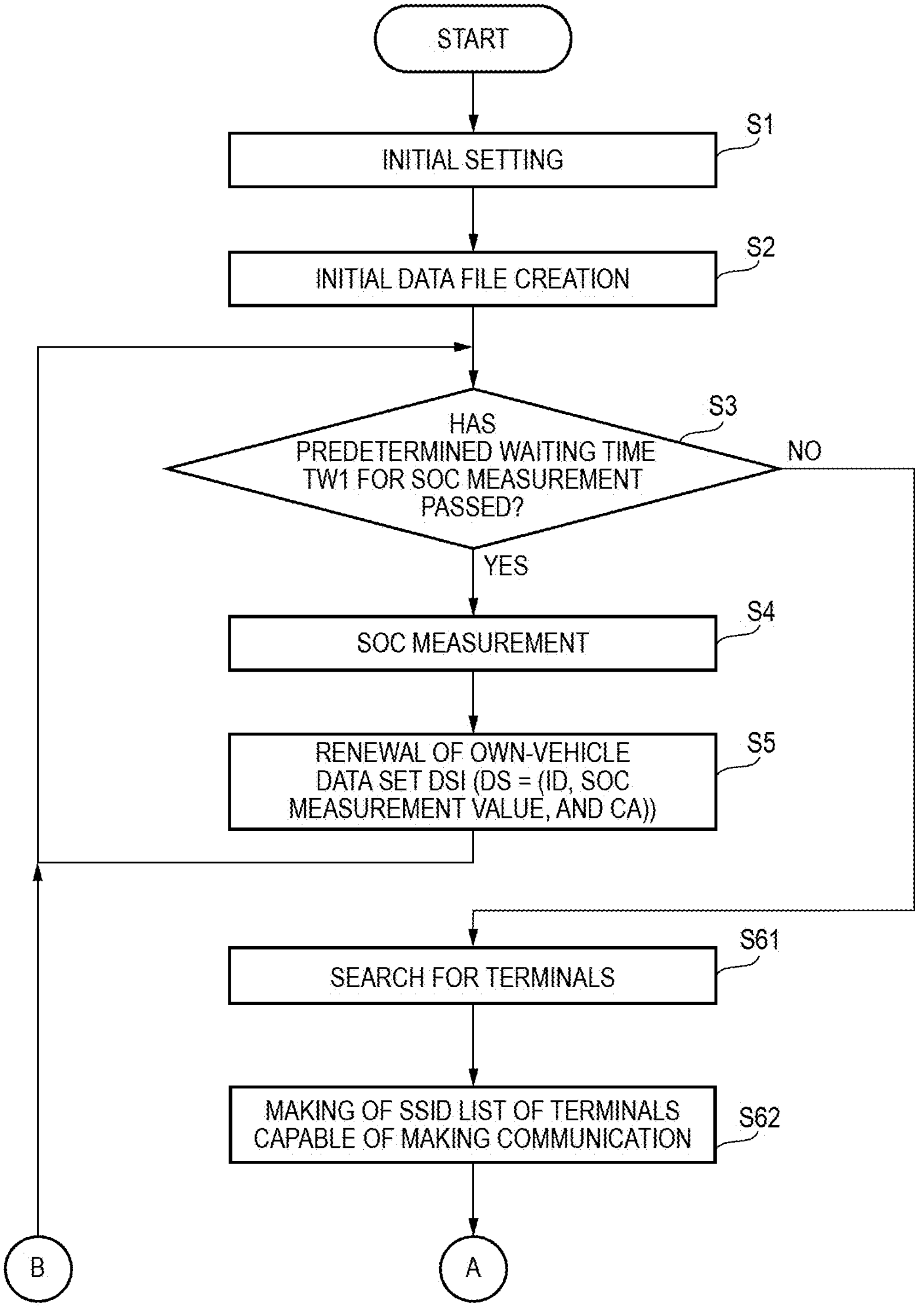
FIG. 9 is the first half of a flow chart of a processing operation of a microprocessor of an on-vehicle diagnosis unit according to modified embodiments 1 and 2 of the present invention.
Figure 10:
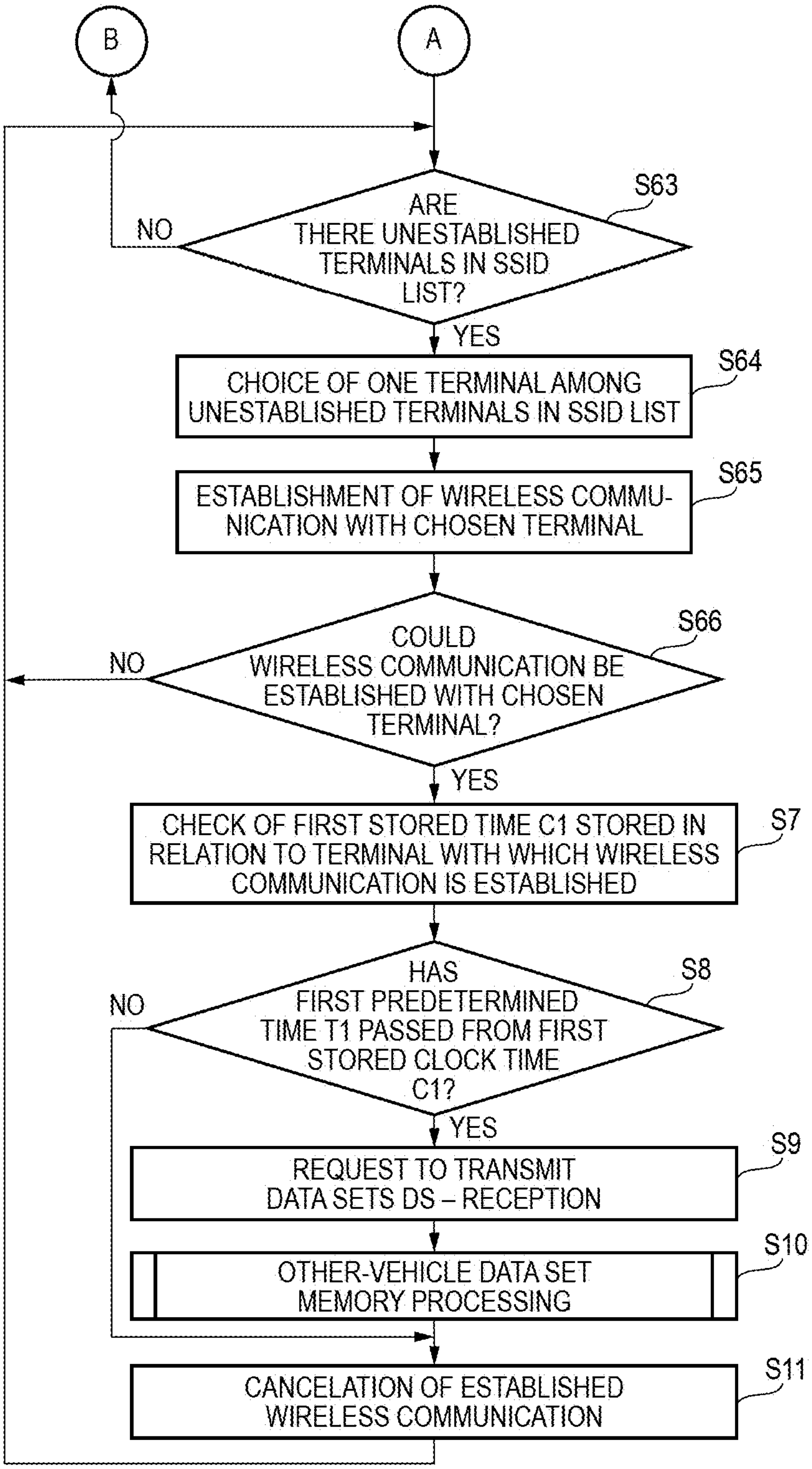
FIG. 10 is the latter half of the flow chart of the processing operation of the microprocessor of the on-vehicle diagnosis unit according to the modified embodiment 1 of the present invention.

FIG. 9 and FIG. 10 are a flow chart of the operation relating to data set acquisition in the microprocessor 16 of the on-vehicle diagnosis unit 10 according to the present modified embodiment 1. The same step numbers as the step numbers in the flow chart of FIG. 4 are assigned to the steps where the same processing as those in the above-described embodiment is performed.

Upon start of the operation of the microprocessor 16, first, initial settings of the wireless communication unit 13 and the SOC measurement unit 12 are made in step S1. In a manner similar to the above-described embodiment, the counter 14C of the local clock 14 that keeps the local time that is unified in the information sharing system 1 in advance, counts up all the time.

In a manner similar to the above-described embodiment also in step S2, initial data files are created to be stored in the memory 15 (the own-vehicle data storing unit 15A and the other-vehicle data storing unit 15B).

Then, in step S3, it is determined whether or not the predetermined waiting time TW1 for SOC measurement (three minutes in the present modified embodiment 1) has passed. When the predetermined waiting time TW1 has passed (Yes), the operation proceeds to step S4 in a manner similar to the above-described embodiment. Then, the on-vehicle diagnosis unit 10 measures the SOC of the battery BT, and stores the data set DS containing the acquired SOC measurement value (diagnostic information) in the own-vehicle data storing unit 15A of the memory 15. Then, upon completing step S5, the operation returns to step S3, and the SOC measurement of the battery BT is repeated at a constant interval (=three minutes in this example).

On the other hand, when the predetermined waiting time TW1 has not passed (No), the operation proceeds to step S61, and first, the on-vehicle diagnosis unit 10 searches for the presence or absence of a wireless communication unit 13, 23 of any of the other terminals 10, 20 (another on-vehicle diagnosis unit 10 or a tablet terminal 20) that is capable of performing wireless communication with the wireless communication unit 13 of the on-vehicle diagnosis unit 10.

Next, in step S62, the on-vehicle diagnosis unit 10 makes an SSID list that is a listing of a service set identifiers (hereinafter, referred to also as the SSIDs) in relation to the wireless communication units 13, 23 of the terminals 10, 20 capable of performing wireless communication that are found by the search.

In the following step 63, the on-vehicle diagnosis unit 10 determines the presence or absence of unestablished terminals 10, 20 (the first unestablished terminals) with which wireless communication has not yet been established after making the SSID list among the terminals 10, 20 (the first communicable terminals) cited in the SSID list. When there is no unestablished terminal 10, 20 in the SSID list (No), the operation returns to step S3, and the on-vehicle diagnosis unit 10 again searches for terminals 10, 20 capable of performing wireless communication therewith in step S61. On the other hand, when there are unestablished terminals 10, 20 in the SSID list (Yes), the operation proceeds to step S64.

In step S64, one terminal 10, 20 (the first chosen terminal) is chosen among the unestablished terminals 10, 20 in the SSID list. In the following step S65, the on-vehicle diagnosis unit 10 establishes peer-to-peer wireless communication with the chosen terminal 10, 20 (the first chosen terminal). In the following step S66, the on-vehicle diagnosis unit 10 checks whether or not the wireless communication could actually be established with the chosen terminal 10, 20 (the first chosen terminal). In this step, when the wireless communication could not be established (No), the operation returns to step S63, while when the wireless communication could be established (Yes), the operation proceeds to step S7.

It is to be noted that the processing from step S7 to step S11 is the same as the processing according to the above-described embodiment shown in FIG. 4. That is, in step S7, the on-vehicle diagnosis unit 10 checks the first stored clock time C1 that has been stored in relation to the terminal 10, 20 with which the wireless communication is established (corresponding to the first terminal).

Then, in the following step S8, the on-vehicle diagnosis unit 10 determines whether or not the current clock time has passed a first predetermined time T1 (T1=five minutes in the present modified embodiment 1) or more from the first stored clock time C1. When the first predetermined time T1 or more has passed (Yes), the operation proceeds to step S9. On the other hand, when the first predetermined time T1 has not passed (No), the operation skips steps S9 and S10, and proceeds to step S11.

In step S9, a request to transmit data sets DS and reception thereof are made with the terminal 10, 20 at the other end. At this moment, the terminal 10, 20 at the other end performs a data set transmission processing routine shown in FIG. 6.

Then, the operation proceeds to step S10, and upon completing the other-vehicle data set memory processing routine shown in FIG. 5, the operation proceeds to step S11.

In step S11, the established wireless communication is canceled. In the present modified embodiment 1, the operation then returns to step S63.

In step S63, the on-vehicle diagnosis unit 10 determines again the presence or absence of unestablished terminals 10, 20 (the first unestablished terminals) in the SSID list. When there is no unestablished terminal 10, 20 in the SSID list (No), the operation returns to step S3, and the on-vehicle diagnosis unit 10 again searches for terminals 10, 20 capable of performing wireless communication therewith in step S61 to make a new SSID list in step S62. On the other hand, when there are unestablished terminals 10, 20 in the SSID list in step S63 (Yes), the operation proceeds to step S64. Then, the on-vehicle diagnosis unit 10 chooses one new terminal 10, 20 (the first chosen terminal) among the unestablished terminals 10, 20 (the first unestablished terminals) to perform the operations of step S65 and the subsequent steps again.

That is, in the on-vehicle diagnosis unit 10 according to the present modified embodiment 1, the operation skips steps S9 and S10 in the case of No in step S8 (in a case where the first predetermined time T1 has not passed from the first stored clock time C1) and step S11 is performed in a manner similar to the above-described embodiment. Thus, the data sets DS are not repeatedly acquired from the same terminals 10, 20 within the first predetermined time T1.

Further, when there are (there remain) unestablished terminals 10, 20 (the first unestablished terminals) in the already-made SSID list in establishing new wireless communication in the case of No in step S8, the on-vehicle diagnosis unit 10 chooses one new terminal 10, 20 (the first chosen terminal) among the unestablished terminals 10, 20. Thus, the on-vehicle diagnosis unit 10 never repeatedly chooses the same terminals 10, 20, and never establishes wireless communication therewith as the terminals 10, 20 at the other ends of wireless communication.

Next, a detailed description of the operation of one tablet terminal 20 according to the present modified embodiment 1 will be provided.

Figure 11:
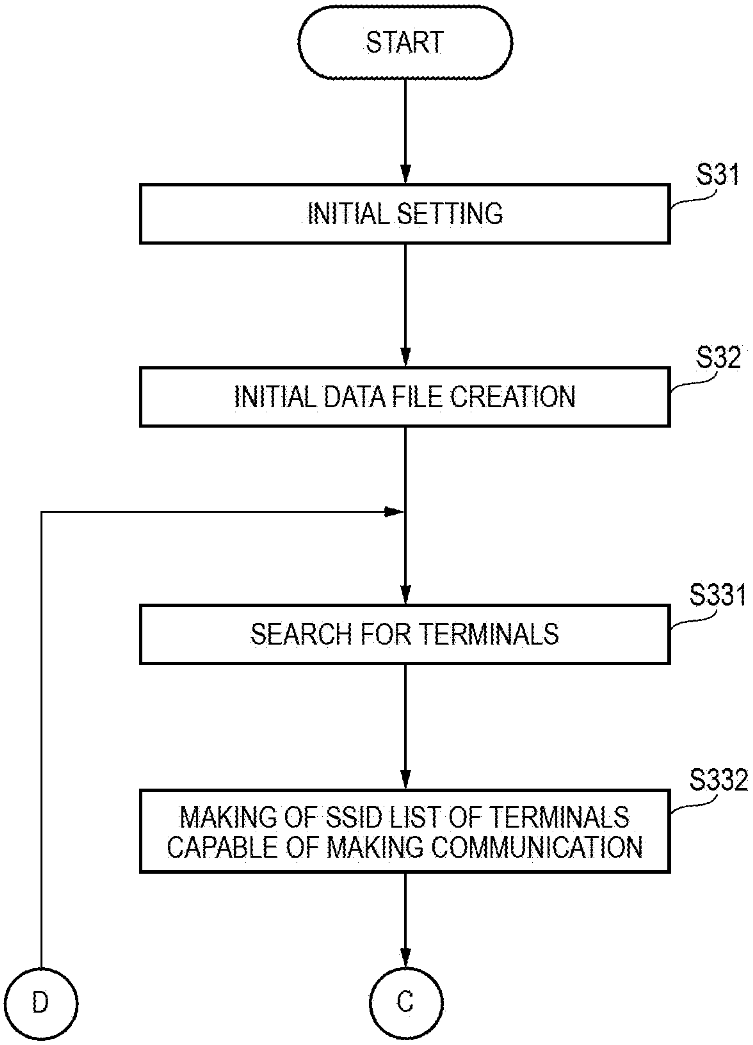
FIG. 11 is the first half of a flow chart of a processing operation of a microprocessor of a tablet terminal according to modified embodiments 1 and 2 of the present invention.
Figure 12:
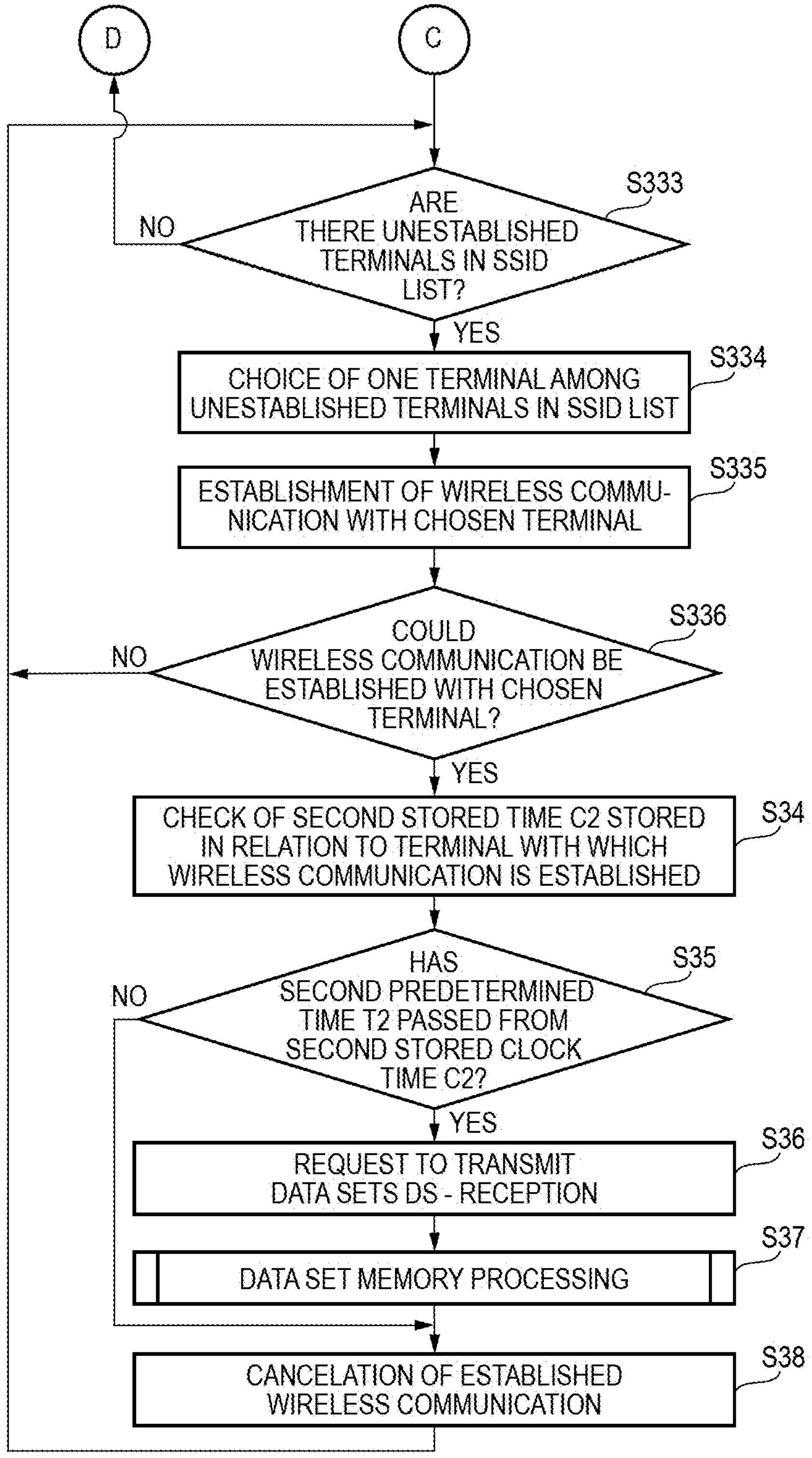
FIG. 12 is the latter half of the flow chart of the processing operation of the microprocessor of the tablet terminal according to the modified embodiment 1 of the present invention.

FIG. 11 and FIG. 12 are a flow chart of the operation relating to data set acquisition in the microprocessor 26 of the tablet terminal 20 according to the present modified embodiment 1. It is to be noted that the same step numbers as step numbers in the flow chart of FIG. 7 are assigned to steps where the same processing as those in the above-described embodiment is performed.

Upon start of the operation of the microprocessor 26, first, an initial setting of the wireless communication unit 23 is made in step S31. In a manner similar to the above-described embodiment, the counter 24C of the local clock 24 counts up all the time.

Then, in step S32, an initial data file for storing data sets DS is created, to be stored in the memory 25 (the data storing unit 25A).

Next, the operation proceeds to step S331, and the tablet terminal 20 searches for the presence or absence of a wireless communication unit 13, 23 of any of the other terminals 10, 20 (an on-vehicle diagnosis unit 10 or another tablet terminal 20) that is capable of performing wireless communication with the wireless communication unit 23 of the tablet terminal 20.

Next, in step S332, the tablet terminal 20 makes an SSID list that is a listing of SSIDs in relation to the wireless communication units 13, 23 of the terminals 10, 20 capable of performing wireless communication that are found by the search.

Further, in the following step 333, the tablet terminal 20 determines the presence or absence of unestablished terminals 10, 20 (the second unestablished terminals) with which wireless communication has not yet been established after making the SSID list among the terminals 10, 20 (the second communicable terminals) cited in the SSID list. When there is no unestablished terminal 10, 20 in the SSID list (No), the operation returns to step S331, and the tablet terminal 20 again searches for terminals 10, 20 capable of performing wireless communication therewith. On the other hand, when there are unestablished terminals 10, 20 in the SSID list (Yes), the operation proceeds to step S334.

In step S334, one terminal 10, 20 (the second chosen terminal) is chosen among the unestablished terminals 10, 20 in the SSID list. In the following step S335, the tablet terminal 20 establishes peer-to-peer wireless communication with the chosen terminal 10, 20 (the second chosen terminal). In the following step S336, the tablet terminal 20 checks whether or not the wireless communication could actually be established with the chosen terminal 10, 20 (the second chosen terminal). In this step, when the wireless communication could not be established (No), the operation returns to a S333, while when the wireless communication could be established (Yes), the operation proceeds to S34.

It is to be noted that the processing from step S34 to step S38 is the same as the processing according to the above-described embodiment shown in FIG. 7. That is, in step S34, the tablet terminal 20 checks a second stored clock time C2 that has been stored in relation to the terminal 10, 20 with which the wireless communication is established (corresponding to the second terminal).

Then, in the following step S35, the tablet terminal 20 determines whether or not the current clock time has passed a second predetermined time T2 (T2=five minutes in the present modified embodiment) or more from the second stored clock time C2. When the second predetermined time T2 or more has passed (Yes), the operation proceeds to step S36. On the other hand, when the second predetermined time T2 has not passed (No), the operation skips steps S36 and S37, and proceeds to step S38.

In step S36, a request to transmit data sets DS and reception thereof are made with the terminal 10, 20 at the other end. At this moment, the terminal 10, 20 at the other end performs a data set transmission processing routine shown in FIG. 6.

Then, the operation proceeds to step S37, and upon completing the data set memory processing routine shown in FIG. 8, the operation proceeds to step S38.

In step S38, the established wireless communication is canceled. In the present modified embodiment 1, the operation then returns to step S333.

In step S333, the tablet terminal 20 determines again the presence or absence of an unestablished terminal 10, 20 (the second unestablished terminal) in the SSID list. When there is no unestablished terminal 10, 20 in the SSID list (No), the operation returns to step S331, and the tablet terminal 20 again searches for terminals 10, 20 capable of performing wireless communication therewith to make a new SSID list in step S332. On the other hand, when there are unestablished terminals 10, 20 in the SSID list (Yes), the operation proceeds to step S334. Then, the tablet terminal 20 chooses one new terminal 10, 20 (the second chosen terminal) among the unestablished terminals 10, 20 (the second unestablished terminals) in the already-made SSID list to perform the operations of step S335 and the subsequent steps again.

That is, in the tablet terminal 20 according to the present modified embodiment 1, the operation skips steps S36 and S37 in the case of No in step S35 (in a case where the second predetermined time T2 has not passed from the second stored clock time C2) and step S38 is performed in a manner similar to the above-described embodiment. Thus, the data sets DS are not repeatedly acquired from the same terminals 10, 20 within the second predetermined time T2.

Further, when there are (there remain) unestablished terminals 10, 20 (the second unestablished terminals) in the already-made SSID list in establishing wireless communication with a new terminal 10, 20 in the case of No in step S35, the tablet terminal 20 chooses one new terminal 10, 20 (the second chosen terminal) among the unestablished terminals 10, 20. Thus, the on-vehicle diagnosis unit 10 never repeatedly chooses the same terminals 10, 20, and never establishes wireless communication therewith as the terminals 10, 20 at the other ends of wireless communication.

In the present modified embodiment 1, the microprocessors 16 of the on-vehicle diagnosis units 10 that perform steps S61 and S62 correspond to the first list making units, and the SSID lists made in step S62 correspond to the first communicable terminal lists. Further, the microprocessors 16 that perform steps S63 and S64 correspond to the first choosing units, and the microprocessors 16 that perform step S65 correspond to the first establishing units.

In addition, the microprocessors 26 of the tablet terminals 20 that perform steps S331 and S332 correspond to the second list making units, and the SSID lists made in step S332 correspond to the second communicable terminal lists. Further, the microprocessors 26 that perform steps S333 and S334 correspond to the second choosing units, and the microprocessors 26 that perform step S335 correspond to the second establishing units.

As described above, in the information sharing system 1 according to the present modified embodiment 1, the on-vehicle diagnosis units 10 and the tablet terminals 20 do not repeatedly acquire the data sets DS within the predetermined times (the first predetermined time T1 and the second predetermined time T2) from the same terminals 10, 20 in a manner similar to the above-described embodiment, which can reduce needless communication among the terminals 10, 20.

Further in the information sharing system 1, when there are unestablished terminals 10, 20 (the first unestablished terminals) in the already-made SSID list in a case where the terminals 10, 20 with which the on-vehicle diagnosis unit 10 establishes wireless communication are the terminals 10, 20 where the first predetermined time T1 has not passed, the on-vehicle diagnosis unit 10 chooses one new terminal 10, 20 (the first chosen terminal) among the unestablished terminals 10, 20 with which to establish new wireless communication. In addition, when there are unestablished terminals 10, 20 (the second unestablished terminals) in the already-made SSID list in a case where the terminals 10, 20 with which the tablet terminal 20 establishes wireless communication are the terminals 10, 20 where the second predetermined time T2 has not passed, the tablet terminal 20 chooses one new terminal 10, 20 (the second chosen terminal) among the unestablished terminals 10, 20 with which to establish new wireless communication. Thus, wireless communication is never repeatedly established with the same terminals 10, 20 as the terminals 10, 20 at the other ends of new wireless communication. Thus, needless communication can be reduced, and communication with different terminals 10, 20 can be performed in an early stage, so that the information in the data sets DS can be diffused in an early stage to prompt sharing of the information.

In the information sharing system 1 according to the present modified embodiment 1, also in a case where the terminals 10, 20 with which the on-vehicle diagnosis unit 10 establishes wireless communication are the terminals 10, 20 where the first predetermined time T1 has passed, the on-vehicle diagnosis unit 10 chooses one new terminal 10, 20 (the first chosen terminal) among the unestablished terminals 10, 20 (the first unestablished terminals) in the already-made SSID list with which to establish new wireless communication after performing the storing into the other-vehicle data storing unit 15B. In addition, also in a case where the terminals 10, 20 with which the tablet terminal 20 establishes wireless communication are the terminals 10, 20 where the second predetermined time T2 has passed, the tablet terminal 20 chooses one new terminal 10, 20 (the second chosen terminal) among the unestablished terminals 10, 20 (the second unestablished terminals) in the already-made SSID list with which to establish new wireless communication after performing the storing into the data storing unit 25A. Thus, even after performing the storing into the other-vehicle data storing unit 15B and the data storing unit 25A, wireless communication is never repeatedly established with the same terminals 10, 20 as the terminals 10, 20 at the other ends of new wireless communication. This configuration can further reduce needless communication.

(Modified embodiment 2)

Further, a description of a second modified embodiment of the above-described embodiment will be provided referring to the flow charts of FIG. 9, FIG. 11, FIG. 13, and FIG. 14. The present modified embodiment 2 is the same in processing operation in each step as the modified embodiment 1 while a part of the flow of the processing operation of the microprocessors 16 of the on-vehicle diagnosis units 10 and a part of the flow the processing operation of the microprocessors 26 of the tablet terminals 20 are different from the modified embodiment 1.

Figure 13:
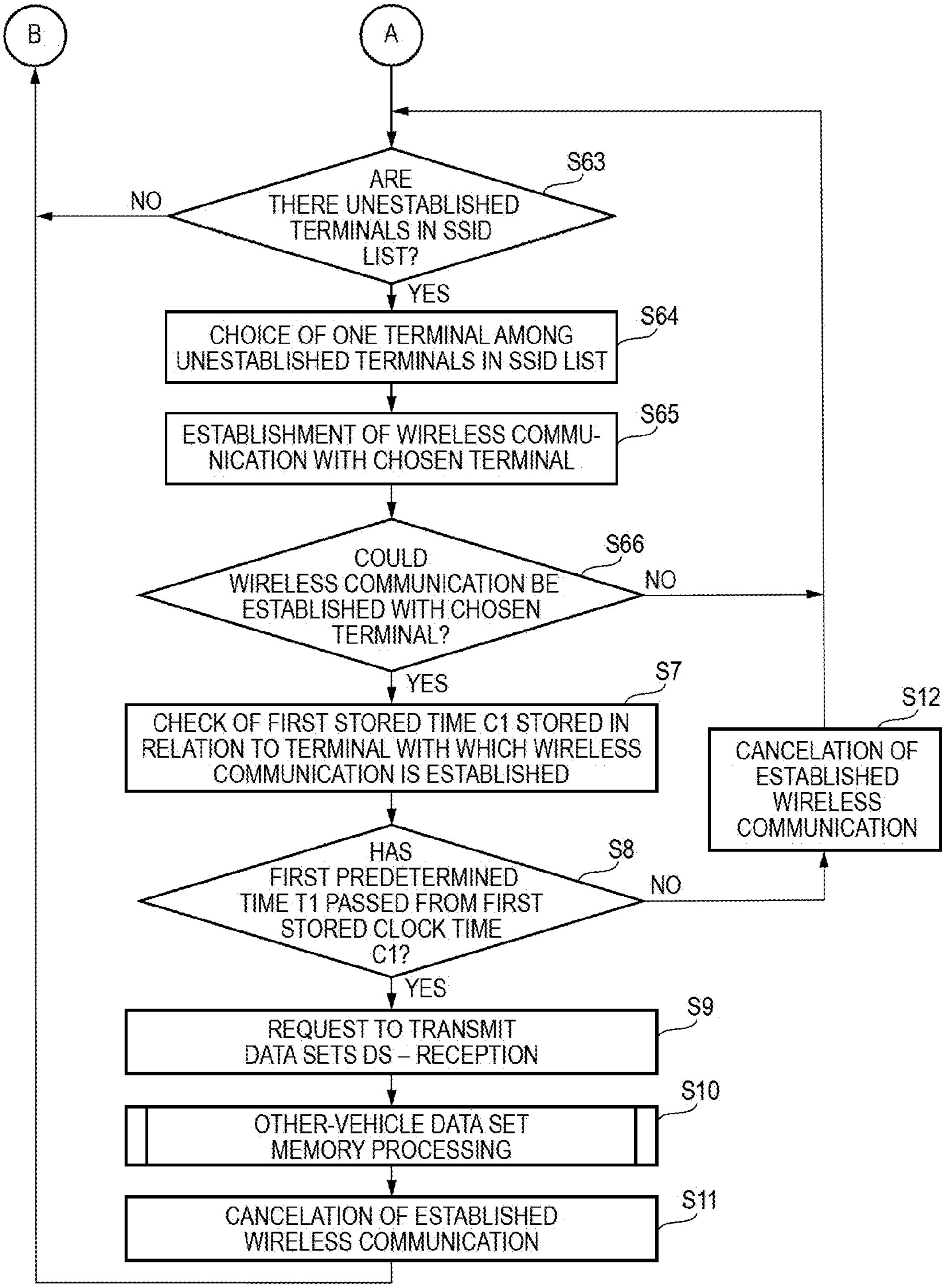
FIG. 13 is the latter half of the flow chart of the processing operation of the microprocessor of the on-vehicle diagnosis unit according to the modified embodiment 2 of the present invention.

FIG. 9 and FIG. 13 are a flow chart of the operation relating to data set acquisition in the microprocessor 16 of one on-vehicle diagnosis unit 10 according to the present modified embodiment 2. FIG. 9 showing the first half of the flow chart is the same as the flow chart of the modified embodiment 1. In addition, in FIG. 9 and FIG. 13, the same step numbers are assigned to the steps where the same processing as those in the modified embodiment 1 is performed. The contents of the steps from step S1 to S11, and S61 to S66 are the same as the contents in the modified embodiment 1, so that descriptions thereof are omitted.

In the on-vehicle diagnosis unit 10 according to the present modified embodiment 2, the operation proceeds to step S12 in the case of No in step S8, and the established wireless communication is canceled in a manner similar to the modified embodiment 1. Further, after this step S12, the operation returns to step S63.

On the other hand, when Yes is chosen in step S8, a request to transmit data sets DS and reception thereof are made in step S9. Then, the on-vehicle diagnosis unit 10 performs an other-vehicle data set memory processing routine in step S10, and then the established wireless communication is canceled in step S11. Then, after step S11, the operation returns to step S3, which is different from the modified embodiment 1 (see FIG. 9).

That is, in the present modified embodiment 2, the operation returns to step S63 in the case of No in step S8, and the on-vehicle diagnosis unit 10 determines the presence or absence of unestablished terminals 10, 20 in the SSID list. When there are unestablished terminals 10, 20 (Yes), the on-vehicle diagnosis unit 10 chooses one terminal 10, 20 among the unestablished terminals 10, 20 in step S64. On the other hand, when reception and storing of the data sets DS are performed in the case of Yes in step S8, the operation returns to step S3. Then, the on-vehicle diagnosis unit 10 again searches for terminals 10, 20 capable of performing wireless communication therewith to make a new SSID list in steps S61 and S62.

Figure 14:
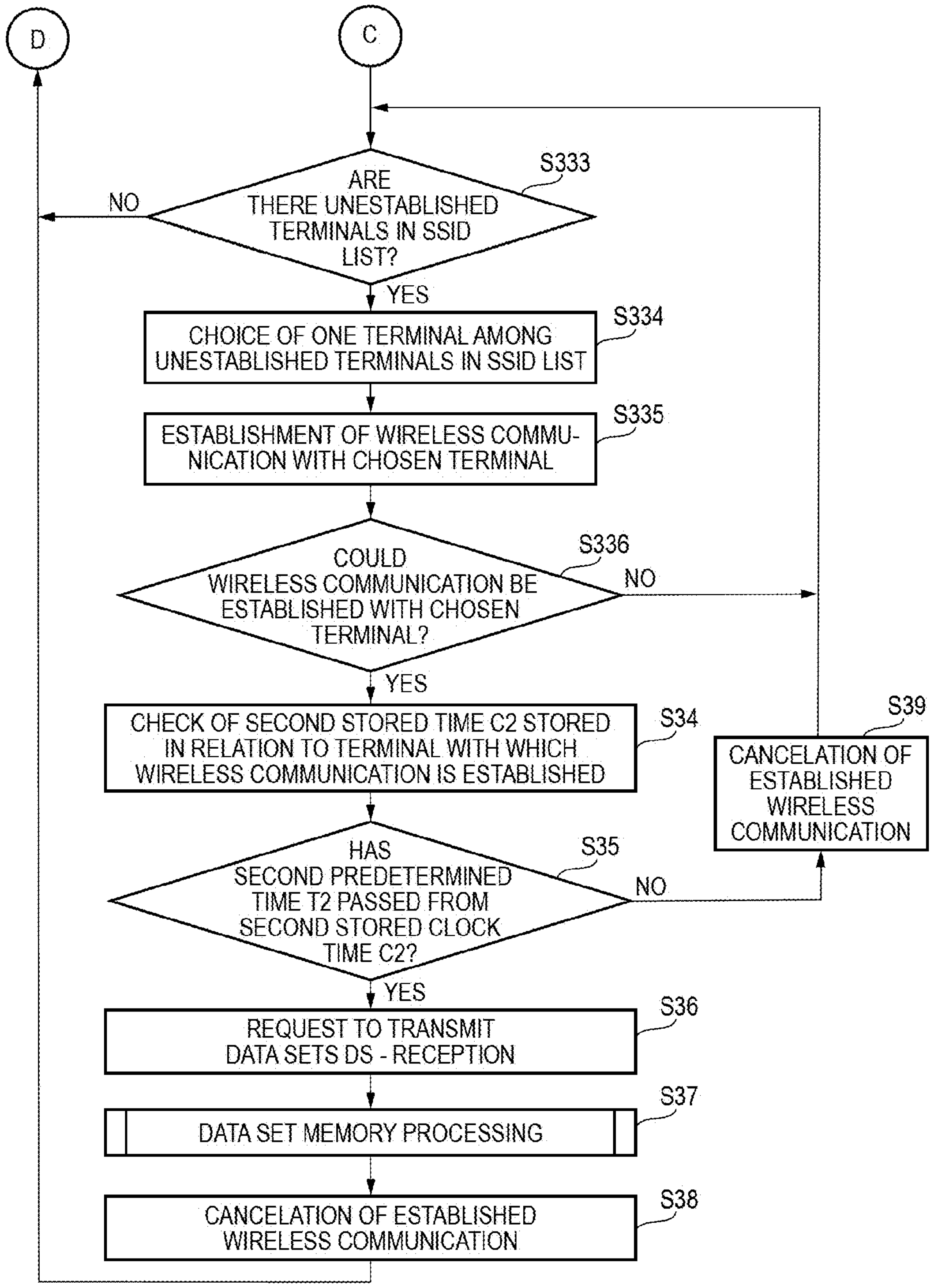
FIG. 14 is the latter half of the flow chart of the processing operation of the microprocessor of the tablet terminal according to the modified embodiment 2 of the present invention.

In addition, FIG. 11 and FIG. 14 are a flow chart of the operation relating to data set acquisition in the microprocessor 26 of one tablet terminal 20 according to the present modified embodiment 2. Also regarding the tablet terminal 20, FIG. 11 showing the first half of the flow chart is the same as the flow chart of the modified embodiment 1 in a manner similar to the on-vehicle diagnosis unit 10. In addition, in FIG. 11 and FIG. 14, the same step numbers are assigned to the steps where the same processing as those in the modified embodiment 1 is performed. The contents of the steps from step S31 to S38, and S331 to S336 are the same as the contents in the modified embodiment 1, so that descriptions thereof are omitted.

Also in the tablet terminal 20 according to the present modified embodiment 2, in a manner similar to the on-vehicle diagnosis unit 10, the operation proceeds to step S39 in the case of No in step S35, and the established wireless communication is canceled in a manner similar to the modified embodiment 1. Further, after this step S39, the operation returns to step S333. In this step S333, the tablet terminal 20 determines the presence or absence of unestablished terminals 10, 20 in the SSID list. When there are unestablished terminals 10, 20 (Yes), the tablet terminal 20 chooses one terminal 10, 20 among the unestablished terminals 10, 20 in step S334.

On the other hand, when Yes is chosen in step S35, the operation proceeds to steps S36 to S38 in a manner similar to the on-vehicle diagnosis unit 10, and then the operation returns to step S331 which is different from the modified embodiment 1 (see FIG. 11). In this step S331, the tablet terminal 20 again searches for a terminal 10, 20 capable of performing wireless communication therewith to make a new SSID list in step S332.

Therefore, also regarding the present modified embodiment 2, when there are unestablished terminals 10, 20 (the first unestablished terminals) in the already-made SSID list in a case where the terminals 10, 20 with which the on-vehicle diagnosis unit 10 establishes wireless communication are the terminals 10, 20 where the first predetermined time T1 has not passed, the on-vehicle diagnosis unit 10 chooses one new terminal 10, 20 (the first chosen terminal) among the unestablished terminals 10, 20 with which to establish new wireless communication in a manner similar to the modified embodiment 1. In addition, when there are unestablished terminals 10, 20 (the second unestablished terminals) in the already-made SSID list in a case where the terminals 10, 20 with which the tablet terminal 20 establishes wireless communication are the terminals 10, 20 where the second predetermined time T2 has not passed, the tablet terminal 20 chooses one new terminal 10, 20 (the second chosen terminal) among the unestablished terminals 10, 20 with which to establish new wireless communication. Thus, in the information sharing system 1 according to the present modified embodiment 2, when it is determined that the first predetermined time T1 and the second predetermined time T2 have not passed, the same working effects as the modified embodiment 1 are produced.

However, in the information sharing system 1 according to the present modified embodiment 2, in a case where the terminals 10, 20 with which the on-vehicle diagnosis unit 10 establishes wireless communication are the terminals 10, 20 where the first predetermined time T1 has passed and after the storing in the other-vehicle data storing unit 15B is performed, the operation returns again to step S61. Then, the on-vehicle diagnosis unit 10 searches for terminals 10, 20 capable of performing wireless communication therewith to make a new SSID list. In addition, in a case where the terminals 10, 20 with which the tablet terminal 20 establishes wireless communication are the terminals 10, 20 where the second predetermined time T2 has passed and after the storing in the data storing unit 25A is performed, the operation again returns to step S331. Then, the tablet terminal 20 searches for terminals 10, 20 capable of performing wireless communication therewith to make a new SSID list. Thus, in the present modified embodiment 2, after the storing in the other-vehicle data storing unit 15B and the storing in the data storing unit 25A are performed, the newer lists are made in order to acquire diagnostic information based on the new lists.

In the above descriptions, the present invention has been explained based on the information sharing systems 1 according to the embodiment and the modified embodiments 1, 2, and the on-vehicle diagnosis units 10 that define on-vehicle diagnosis terminals and the tablet terminals 20 that define display terminals that are used in the information sharing systems 1. However, there is no intent to limit the present invention to these embodiments, and modifications and variations are possible as long as they do not deviate from the principles of the present invention.

For example, while the plurality of tablet terminals 20 (20A, 20B) are used as the display terminals in the embodiments, fixed personal computer terminals may be used as the display terminals.

In addition, the embodiments describe the information sharing system 1 including the plurality of tablet terminals 20 (20A, 20B) where the on-vehicle diagnosis units 10 are capable of acquiring the data sets DS from any of the other on-vehicle diagnosis units 10 and the tablet terminals 20, while the tablet terminals 20 are capable of acquiring the data sets DS from the on-vehicle diagnosis units 10 and any of the other tablet terminals 20.

In contrast, the information sharing system 1 may be a system including only one display terminal such as a tablet terminal 20 and a PC terminal, that is, a system where there is no communication between display terminals (tablet terminals 20).

In addition, the embodiments describe the system where the terminals 10, 20 can acquire the data sets DS also from the tablet terminals 20; however, the information sharing system 1 may be a system where on-vehicle diagnosis units 10 are not capable of acquiring data sets DS from display terminals 20 while being capable of acquiring data sets DS only from any of the other on-vehicle diagnosis units 10, and the display terminals 20 are not capable of acquiring data sets DS from any of the other display terminals 20 while being capable of acquiring data sets DS only from the on-vehicle diagnosis units 10. In this case, the other ends with which the on-vehicle diagnosis units 10 and the display terminals 20 establish wireless communication to acquire the data sets DS are only the on-vehicle diagnosis units 10.

In addition, the embodiments describe the diagnostic information on the carts EV as the states of charge (SOC) of the batteries BT. However, in addition, diagnostic information such as temperatures of the batteries BT and air pressure in the tires (having a flat tire or not) may be acquired. In addition, the electric vehicles on which the on-vehicle diagnosis units 10 are mounted may be electric carts used in hospital or amusement park facilities and retirement communities in addition to the golf carts exemplified in the embodiments.

In addition, in the embodiments, the common time is uniquely set in the information sharing system 1 in setting the common time, and the local clock 14, 24 provided to the terminals 10, 20 is used. However, in setting the common time, a clock time acquired from a clock of a satellite such as a GPS satellite, or a clock time acquired from a clock time site on the Internet may be used.

In addition, in the embodiments, the wireless communication units 13, 23 of the terminals 10, 20 perform peer-to-peer wireless communication using Wi-Fi Direct; however, another communication protocol such as an ad hoc mode that defines an operation mode of an IEEE 802.11 wireless LAN protocol that is capable of performing peer-to-peer wireless communication may be used.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application claims priority from U.S. Provisional Application Nos. 61/903,592 filed Nov. 13, 2013 and 61/982,004 filed Apr. 21, 2014, the above noted applications incorporated herein by reference in their entirety.

What is claimed is:

1. An information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, the on-vehicle diagnosis terminals comprising:

the first communication unit, and a diagnostic information acquiring unit configured to acquire diagnostic information on an electric vehicle equipped with the on-vehicle diagnosis terminal, the one or the plurality of display terminals comprising:

the second communication unit, and a display configured to display the diagnostic information on the electric vehicles equipped with the on-vehicle diagnosis terminals, the on-vehicle diagnosis terminals and the one or the plurality of display terminals sharing the diagnostic information on the electric vehicles equipped with the on-vehicle diagnosis terminals over wireless communication among the terminals using the communication units, wherein the on-vehicle diagnosis terminals comprise:

a first clock unit that keeps a common time that is unified in the information sharing system;

an own-vehicle data storing unit configured to store one or more own-vehicle data sets that each comprise one or more data sets comprising at least a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; and an other-vehicle data storing unit configured to store other-vehicle data sets that comprise the data sets on other electric vehicles that are acquired through the first communication unit of the on-vehicle diagnosis terminal, wherein the one or the plurality of display terminals comprise:

a second clock unit that keeps the common time; and a data storing unit configured to store data sets on the electric vehicles that are acquired through the second communication unit of the display terminal, wherein the on-vehicle diagnosis terminals comprise:

a first communication establishing unit configured to establish peer-to-peer wireless communication with the communication units of the terminals capable of establishing wireless communication with the on-vehicle diagnosis terminal;

a first newly-storing unit configured to make the other-vehicle data storing unit of the on-vehicle diagnosis terminal store new data sets comprising at least a unique identifier that is not stored in the other-vehicle data storing unit of the on-vehicle diagnosis terminal among the data sets stored in first terminals that comprise the terminals with which the wireless communication is established with the on-vehicle diagnosis terminal;

a first renewing and storing unit configured to renew and store the one or more data sets that each comprises at least a unique identifier which is the same as the unique identifier of an other-vehicle data set stored in the other-vehicle data storing unit of the on-vehicle diagnosis terminal, and has a newer acquisition clock time among the data sets stored in the first terminals; and a first clock time storing unit configured to renew and store, every time a data set stored in each first terminal is stored in the other-vehicle data storing unit of the on-vehicle diagnosis terminal, a first stored clock time in the common time for every first terminal, the first stored clock time being the stored timing, wherein the one or the plurality of display terminals comprise:

a second communication establishing unit configured to establish peer-to-peer wireless communication with the communication units of the terminals capable of establishing wireless communication with the display terminal;

a second newly-storing unit configured to make the data storing unit of the display terminal store a new data set comprising at least a unique identifier that is not stored in the data storing unit of the display terminal among the data sets stored in second terminals that comprise the terminals with which the wireless communication is established with the display terminal;

a second renewing and storing unit configured to renew and store the data sets that each comprise at least a unique identifier which is the same as the unique identifier of the data set stored in the data storing unit of the display terminal, and has a newer acquisition clock time among the data sets stored in the second terminals; and a second clock time storing unit configured to renew and store, every time a data set stored in each second terminal is stored in the data storing unit of the display terminal, a second stored clock time in the common time for every second terminal, the second stored clock time being the stored timing, wherein the on-vehicle diagnosis terminals comprise a first determination unit configured to:

determine, when the peer-to-peer wireless communication is established by the first communication establishing unit, whether or not a first predetermined time has passed from the first stored clock times that are stored in relation to the first terminals with which the wireless communication is established;

perform, when the first predetermined time has passed, the storing into the other-vehicle data storing units using the first newly-storing units and the first renewing and storing units; and establish, when the first predetermined time has not passed, new wireless communication using the first communication establishing units with the communication units of the terminals capable of establishing wireless communication with the on-vehicle diagnosis terminal, and wherein the one or the plurality of display terminals comprise a second determination unit configured to:

determine, when the peer-to-peer wireless communication is established by the second communication establishing unit, whether or not a second predetermined time has passed from the second stored clock times that are stored in relation to the second terminals with which the wireless communication is established;

perform, when the second predetermined time has passed, the storing into the data storing units using the second newly-storing units and the second renewing and storing units; and establish, when the second predetermined time has not passed, new wireless communication using the second communication establishing units with the communication units of the terminals capable of establishing wireless communication with the display terminal.

2. The information sharing system as claimed in claim 1, wherein the first communication establishing units of the on-vehicle diagnosis terminals comprise a first searching unit configured to search for the communication units of the terminals capable of establishing wireless communication with the first communication establishing unit, wherein the first communication establishing units of the on-vehicle diagnosis terminals are configured to establish the peer-to-peer wireless communication with the searched communication units of the terminals, wherein the second communication establishing units of the display terminals comprise a second searching unit configured to search for the communication units of the terminals capable of establishing wireless communication with the second communication establishing unit, wherein the second communication establishing units of the display terminals are configured to establish the peer-to-peer wireless communication with the searched communication units of the terminals, wherein the on-vehicle diagnosis terminals is configured to, when it is determined that the first predetermined time has not passed by the first determination units, search for the terminals capable of establishing wireless communication with the on-vehicle diagnosis terminals using the first searching units, and wherein the one or the plurality of display terminals is configured to, when it is determined that the second predetermined time has not passed by the second determination units, search for the terminals capable of establishing wireless communication with the display terminals using the second searching units.

3. The information sharing system as claimed in claim 1, wherein the first communication establishing units of the on-vehicle diagnosis terminals comprise:

a first list making unit configured to search for the communication units of the terminals capable of establishing wireless communication with the first communication establishing unit, and to make a first communicable terminal list;

a first choosing unit configured to choose one first chosen terminal from first unestablished terminals with which wireless communication has not yet been established after making the first communicable terminal list among the first communicable terminals cited in the first communicable terminal list; and a first establishing unit configured to establish the peer-to-peer wireless communication with the communication unit of the chosen first chosen terminal, wherein the second communication establishing units of the display terminals comprise:

a second list making unit configured to search for the communication units of the terminals capable of establishing wireless communication with the second communication establishing unit, and to make a second communicable terminal list;

a second choosing unit configured to choose one second chosen terminal from second unestablished terminals with which wireless communication has not yet been established after making the second communicable terminal list among the second communicable terminals cited in the second communicable terminal list; and a second establishing unit configured to establish the peer-to-peer wireless communication with the communication unit of the chosen second chosen terminal, wherein each of the on-vehicle diagnosis terminals is configured to, when it is determined that the first predetermined time has not passed by the first determination unit, choose one new first chosen terminal from the first unestablished terminals using the first choosing unit, and wherein each of the one or the plurality of display terminals is configured to, when it is determined that the second predetermined time has not passed by the second determination unit, choose one new second chosen terminal from the second unestablished terminals using the second choosing unit.

4. The information sharing system as claimed in claim 3, wherein each of the on-vehicle diagnosis terminals is configured to, when it is determined that the first predetermined time has passed by the first determination unit, choose one new first chosen terminal from the first unestablished terminals using the first choosing unit after the storing into the other-vehicle data storing unit is performed, and wherein each of the one or the plurality of display terminals is configured to, when it is determined that the second predetermined time has passed by the second determination unit, choose one new second chosen terminal from the second unestablished terminals using the second choosing unit after the storing into the data storing unit is performed.

5. The information sharing system as claimed in claim 1, wherein the one or the plurality of display terminals comprise a plurality of display terminals, and wherein each of the second communication establishing units of the display terminals establishes wireless communication with any one of the first communication units of the on-vehicle diagnosis terminals and the second communication units of the display terminals.

6. The information sharing system as claimed in claim 1, wherein the diagnostic information acquiring units of the on-vehicle diagnosis terminals comprise an SOC information-acquiring unit configured to acquire information on a state of charge of a battery mounted on the electric vehicle equipped with the diagnostic information acquiring unit.

7. The information sharing system as claimed in claim 1, wherein each of the first clock units and the second clock units keeps a local time that is the only time used in the information sharing system as the common time.

8. The information sharing system as claimed in claim 7, wherein each of the first clock units and the second clock units comprises a counter configured to count up at predetermined time intervals that are unified in the information sharing system, and wherein each of the first clock units and the second clock units uses, as the local time, count values of counters acquired by starting count from predetermined timings that are unified in the information sharing system.

9. An on-vehicle diagnosis terminal used in an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, the on-vehicle diagnosis terminals comprising:

the first communication unit; and a diagnostic information acquiring unit configured to acquire diagnostic information on an electric vehicle equipped with the on-vehicle diagnosis terminal, the one or the plurality of display terminals comprising:

the second communication unit; and a display configured to display the diagnostic information on the electric vehicles equipped with the on-vehicle diagnosis terminals, and the on-vehicle diagnosis terminals and the one or the plurality of display terminals sharing the diagnostic information on the electric vehicles equipped with the on-vehicle diagnosis terminals over wireless communication among the terminals using the communication units, wherein the on-vehicle diagnosis terminal used in the information sharing system comprises:

a first clock unit that keeps common time that is unified in the information sharing system;

an own-vehicle data storing unit configured to store one or more own-vehicle data sets that each comprises one or more data set comprising at least a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired;

an other-vehicle data storing unit configured to store other-vehicle data sets that comprise the data sets on other electric vehicles that are acquired through the first communication unit of the on-vehicle diagnosis terminal;

a second clock unit that keeps the common time;

a data storing unit configured to store data sets on the electric vehicles that are acquired through the second communication unit of the display terminal;

a first communication establishing unit configured to establish peer-to-peer wireless communication with the communication units of the terminals capable of establishing wireless communication with the on-vehicle diagnosis terminal;

a first newly-storing unit configured to make the other-vehicle data storing unit of the on-vehicle diagnosis terminal store new data sets comprising at least a unique identifier that is not stored in the other-vehicle data storing unit of the on-vehicle diagnosis terminal among the data sets stored in first terminals that comprise the terminals with which the wireless communication is established with the on-vehicle diagnosis terminal;

a first renewing and storing unit configured to renew and store the one or more data sets that each comprises at least a unique identifier which is the same as the unique identifier of an other-vehicle data set stored in the other-vehicle data storing unit of the on-vehicle diagnosis terminal, and has a newer acquisition clock time among the data sets stored in the first terminals;

a first clock time storing unit configured to renew and store, every time the data set stored in each first terminal is stored in the other-vehicle data storing unit of the on-vehicle diagnosis terminal, a first stored clock time in the common time for every first terminal, the first stored clock time being the stored timing;

a second communication establishing unit configured to establish peer-to-peer wireless communication with the communication units of the terminals capable of establishing wireless communication with the display terminal;

a second newly-storing unit configured to make the data storing unit of the display terminal store a new data set comprising at least a unique identifier that is not stored in the data storing unit of the display terminal among the data sets stored in second terminals that comprise the terminals with which the wireless communication is established with the display terminal;

a second renewing and storing unit configured to renew and store the data sets that each comprise at least a unique identifier which is the same as the unique identifier of the data set stored in the data storing unit of the display terminal, and has a newer acquisition clock time among the data sets stored in the second terminals;

a second clock time storing unit configured to renew and store, every time a data set stored in each second terminal is stored in the data storing unit of the display terminal, a second stored clock time in the common time for every second terminal, the second stored clock time being the stored timing;

a first determination unit configured to determine, when the peer-to-peer wireless communication is established by the first communication establishing unit, whether or not a first predetermined time has passed from the first stored clock times that are stored in relation to the first terminals with which the wireless communication is established, wherein the on-vehicle diagnosis terminal used in the information sharing system performs, when the first predetermined time has passed, the storing into the other-vehicle data storing unit using the first newly-storing unit and the first renewing and storing unit, and wherein the on-vehicle diagnosis terminal used in the information sharing system establishes, when the first predetermined time has not passed, new wireless communication using the first communication establishing unit with the communication units of the terminals capable of establishing wireless communication with the on-vehicle diagnosis terminal; and a second determination unit configured to:

determine, when the peer-to-peer wireless communication is established by the second communication establishing unit, whether or not a second predetermined time has passed from the second stored clock times that are stored in relation to the second terminals with which the wireless communication is established, perform, when the second predetermined time has passed, the storing into the data storing units using the second newly-storing units and the second renewing and storing units, and establish, when the second predetermined time has not passed, new wireless communication using the second communication establishing units with the communication units of the terminals capable of establishing wireless communication with the display terminal.

10. A display terminal used in an information sharing system comprising a plurality of on-vehicle diagnosis terminals, and one or a plurality of display terminals, the on-vehicle diagnosis terminals and the one or the plurality of display terminals comprising a terminal that comprises a communication unit including one of first and second communication units configured to perform peer-to-peer wireless communication, wherein the on-vehicle diagnosis terminals comprise:

the first communication unit, and a diagnostic information acquiring unit configured to acquire diagnostic information on an electric vehicle equipped with the on-vehicle diagnosis terminal;

a first clock unit that keeps common time that is unified in the information sharing system;

an own-vehicle data storing unit configured to store one or more own-vehicle data sets that each comprises a data set comprising a unique identifier that is uniquely assigned to the on-vehicle diagnosis terminal, the diagnostic information acquired by the diagnostic information-acquiring unit of the on-vehicle diagnosis terminal, and an acquisition clock time in the common time at which the diagnostic information is acquired; and an other-vehicle data storing unit configured to store other-vehicle data sets that comprise the data sets on other electric vehicles that are acquired through the first communication unit of the on-vehicle diagnosis terminal, wherein the one or the plurality of display terminals comprise the second communication unit, and a display configured to display the diagnostic information on the electric vehicles equipped with the on-vehicle diagnosis terminals, wherein the on-vehicle diagnosis terminals and the one or the plurality of display terminals sharing the diagnostic information on the electric vehicles equipped with the on-vehicle diagnosis terminals over wireless communication among the terminals using the communication units, wherein the display terminal used in the information sharing system comprises:

a second clock unit that keeps the common time;

a data storing unit configured to store data sets on the electric vehicles that are acquired through the second communication unit of the display terminal;

a second communication establishing unit configured to establish peer-to-peer wireless communication with the communication units of the terminals capable of establishing wireless communication with the display terminal;

a second newly-storing unit configured to make the data storing unit of the display terminal store one or more new data sets comprising at least a unique identifier that is not stored in the data storing unit of the display terminal among the data sets stored in second terminals that comprise the terminals with which the wireless communication is established with the display terminal;

a second renewing and storing unit configured to renew and store the data sets that each comprises at least a unique identifier which is the same as the unique identifier of the data set stored in the data storing unit of the display terminal, and has the newer acquisition clock time among the data sets stored in the second terminals;

a second clock time storing unit configured to renew and store, every time a data set stored in each second terminal is stored in the data storing unit of the display terminal, a second stored clock time in the common time for every second terminal, the second stored clock time being the stored timing; and a second determination unit configured to determine, when the peer-to-peer wireless communication is established by the second communication establishing unit, whether or not a second predetermined time has passed from the second stored clock times that are stored in relation to the second terminals with which the wireless communication is established, wherein the display terminal used in the information sharing system performs, when the second predetermined time has passed, the storing into the data storing unit using the second newly-storing unit and the second renewing and storing unit, and wherein the display terminal used in the information sharing system establishes, when the second predetermined time has not passed, new wireless communication using the second communication establishing units with the communication units of the terminals capable of establishing wireless communication with the display terminal.

* * * * *